(12) United States Patent
Tanaka

(10) Patent No.: US 10,416,189 B2
(45) Date of Patent: Sep. 17, 2019

(54) PHYSICAL QUANTITY SENSOR, PHYSICAL QUANTITY SENSOR DEVICE, ELECTRONIC APPARATUS, AND VEHICLE

(71) Applicant: Seiko Epson Corporation, Tokyo (JP)

(72) Inventor: Satoru Tanaka, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/833,272

(22) Filed: Dec. 6, 2017

(65) Prior Publication Data

US 2018/0156839 A1 Jun. 7, 2018

(30) Foreign Application Priority Data

Dec. 7, 2016 (JP) .................. 2016-237919

(51) Int. Cl.
| | | |
|---|---|---|
| *G01P 15/125* | (2006.01) | |
| *B60G 17/019* | (2006.01) | |
| *G01P 15/08* | (2006.01) | |

(52) U.S. Cl.
CPC ...... *G01P 15/125* (2013.01); *B60G 17/01941* (2013.01); *B60G 2400/10* (2013.01); *G01P 2015/0814* (2013.01)

(58) Field of Classification Search
CPC .......... G01P 15/125; G01P 2015/0814; B60G 17/01941; B60G 2400/10
USPC ......................................................... 701/36
See application file for complete search history.

(56) References Cited

U.S. PATENT DOCUMENTS

| | | |
|---|---|---|
| 5,983,721 A | 11/1999 | Sulzberger et al. |
| 7,322,242 B2 | 1/2008 | Merassi et al. |
| 8,516,890 B2 | 8/2013 | Rehle |
| 2008/0192406 A1 | 8/2008 | Despesse et al. |
| 2011/0179870 A1 | 7/2011 | Chan et al. |
| 2015/0070031 A1* | 3/2015 | Tanaka .................. G01D 5/241 324/661 |
| 2016/0204716 A1* | 7/2016 | Suzuki ................. B81B 3/0054 359/230 |

FOREIGN PATENT DOCUMENTS

| | | |
|---|---|---|
| JP | 2007-139505 A | 6/2007 |
| JP | 2010-238921 A | 10/2010 |
| WO | WO-2011-028359 A2 | 3/2011 |

OTHER PUBLICATIONS

Extended European Search Report for Patent Application No. EP17205432.2 dated Feb. 9, 2018 (8 pages).

* cited by examiner

*Primary Examiner* — Gertrude Arthur Jeanglaude
(74) *Attorney, Agent, or Firm* — Harness, Dickey & Pierce, P.L.C.

(57) ABSTRACT

A physical quantity sensor includes a stationary electrode, an X-axis displaceable movable member, and a movable electrode. The stationary electrode includes first and second movable electrodes arranged side by side along the Y-axis direction. The first and second stationary electrodes respectively include first and second stationary electrode fingers extending from first and second trunks in the ±Y-axis directions. The movable electrode includes first and second movable electrodes arranged side by side in the Y-axis direction. The first and second movable electrodes respectively include first and second movable electrode fingers located on both sides in the Y-axis direction of the first and second trunks, and opposed to the first and second stationary electrode fingers.

19 Claims, 20 Drawing Sheets

PHYSICAL QUANTITY SENSOR, PHYSICAL QUANTITY SENSOR DEVICE, ELECTRONIC APPARATUS, AND VEHICLE

BACKGROUND

1. Technical Field

The present invention relates to a physical quantity sensor, a physical quantity sensor device, an electronic apparatus, and a vehicle.

2. Related Art

Known acceleration sensors capable of detecting acceleration (a physical quantity) are described in JP-A-2007-139505 and JP-A-2010-238921.

The acceleration sensor of JP-A-2007-139505 includes a substrate, a movable member, a first movable electrode section, a second movable electrode section, a first stationary electrode section, and a second stationary electrode section, wherein the movable member can be displaced in an X-axis direction (a first direction along a detection axis) with respect to the substrate, the first movable electrode section and the second movable electrode section are provided to the movable member and are arranged side by side in a Y-axis direction (a second direction perpendicular to the first direction), and the first stationary electrode section and the second stationary electrode section are fixed to the substrate and are arranged side by side in the Y-axis direction. Further, the first stationary electrode section has first stationary electrode fingers extending toward the negative side in the Y-axis direction, and the second stationary electrode section has second stationary electrode fingers extending toward the positive side in the Y-axis direction. Further, the first movable electrode section has first movable electrode fingers extending from the movable member toward the positive side in the Y-axis direction, and opposing the first stationary electrode fingers in the X-axis direction, and the second movable electrode section has second movable electrode fingers extending from the movable member toward the negative side in the Y-axis direction, and opposing the second stationary fingers in the X-axis direction.

The acceleration sensor of JP-A-2010-238921 includes a substrate, a movable member, a first movable electrode section, a second movable electrode section, a first stationary electrode section, and a second stationary electrode section, wherein the movable member can be displaced in a first direction along a detection axis with respect to the substrate, the first movable electrode section and the second movable electrode section are provided to the movable member and are arranged side by side in the first direction, and the first stationary electrode section and the second stationary electrode section are fixed to the substrate and are arranged side by side in the first direction. Further, the first stationary electrode section has a plurality of first stationary electrode fingers extending toward both sides in a second direction perpendicular to the first direction, and the second stationary electrode section has a plurality of second stationary electrode fingers extending toward both sides in the second direction. Further, the first movable electrode section has first movable electrode fingers extending from the movable member toward both sides in the second direction, and opposing the first stationary electrode fingers in the first direction, and the second movable electrode section has second movable electrode fingers extending from the movable member toward both sides in the second direction, and opposing the second stationary fingers in the first direction.

However, in the acceleration sensors described in JP-A-2007-139505 and JP-A-2010-238921, there is a problem that all of the first and second stationary electrode fingers and the first and second movable electrode fingers are elongated, and therefore easily damaged (easily broken) due to an impact or the like.

SUMMARY

An advantage of the invention is to provide a physical quantity sensor, a physical quantity sensor device, an electronic apparatus and a vehicle having electrode fingers that are hard break, and have excellent impact resistance.

The invention can be implemented in the following configuration examples.

A physical quantity sensor according to an aspect of the invention includes a base, and an sensor element provided to the base, and detecting a physical quantity, the sensor element includes a stationary electrode fixed to the base, a movable member which can be displaced in a first direction as a detection axis direction of the physical quantity with respect to the base, and a movable electrode provided to the movable member, the stationary electrode includes a first stationary electrode and a second stationary electrode arranged side by side in the second direction which is a direction crossing the detection axis, the first stationary electrode includes a first trunk, and a plurality of first stationary electrode fingers extending from the first trunk toward both sides in the second direction, the second stationary electrode includes a second trunk, and a plurality of second stationary electrode fingers extending from the second trunk toward both sides in the second direction, the movable electrode includes a first movable electrode and a second movable electrode arranged side by side in the second direction, at least a part of the first movable electrode includes a plurality of first movable electrode fingers located on both sides in the second direction of the first trunk, and opposed to the first stationary electrode fingers in the first direction, and at least a part of the second movable electrode includes a plurality of second movable electrode fingers located on both sides in the second direction of the second trunk, and opposed to the second stationary electrode fingers in the first direction.

With this configuration, it is possible to shorten each of the first and second stationary electrode fingers and the first and second movable electrode fingers. Therefore, a physical quantity sensor, which has electrode fingers that are hard to damage, and has excellent impact resistance, is obtained.

In the physical quantity sensor according to the aspect of the invention, it is preferable that the first trunk and the second trunk extend in a tilted direction with respect to each of the first direction and the second direction.

With this configuration, it is possible to form shorter electrode fingers.

In the physical quantity sensor according to the aspect of the invention, it is preferable that the first trunk and the second trunk are tilted toward respective sides opposite to each other with respect to the first direction.

With this configuration, it is possible to dispose the bonding surface of the movable member on the base, the bonding surface of the first stationary electrode on the base, and the bonding surface of the second stationary electrode on the base closer to each other. Therefore, deflection of the base has minimal impact, and it is possible to detect the physical quantity with higher accuracy.

In the physical quantity sensor according to the aspect of the invention, it is preferable that the plurality of first stationary electrode fingers is disposed side by side in the first direction, the lengths along the second direction of the plurality of first stationary electrode fingers located on one side in the second direction of the first trunk and disposed side by side in the first direction descend (decrease) toward one side in the first direction, the lengths along the second direction of the plurality of first stationary electrode fingers located on the other side in the second direction of the first trunk and disposed side by side in the first direction ascend (increase) toward the one side in the first direction, the plurality of second stationary electrode fingers is disposed side by side in the first direction, the lengths along the second direction of the plurality of second stationary electrode fingers located on the one side in the second direction of the second trunk and disposed side by side in the first direction ascend (increase) toward the one side in the first direction, and the lengths along the second direction of the plurality of second stationary electrode fingers located on the other side in the second direction of the second trunk and disposed side by side in the first direction descend (decrease) toward the one side in the first direction.

With this configuration, it is possible to more effectively avoid damage due to an impact or the like in the plurality of first and second stationary electrode fingers.

In the physical quantity sensor according to the aspect of the invention, it is preferable that the plurality of first movable electrode fingers is disposed side by side in the first direction, the lengths along the second direction of the plurality of first movable electrode fingers located on one side in the second direction of the first trunk and disposed side by side in the first direction descend toward one side in the first direction, the lengths along the second direction of the plurality of first movable electrode fingers located on the other side in the second direction of the first trunk and disposed side by side in the first direction ascend toward the one side in the first direction, the plurality of second movable electrode fingers is disposed side by side in the first direction, the lengths along the second direction of the plurality of second movable electrode fingers located on the one side in the second direction of the second trunk and disposed side by side in the first direction ascend toward the one side in the first direction, and the lengths along the second direction of the plurality of second movable electrode fingers located on the other side in the second direction of the second trunk and disposed side by side in the first direction descend toward the one side in the first direction.

With this configuration, it is possible to more effectively avoid damage due to an impact or the like in the plurality of first and second movable electrode fingers.

In the physical quantity sensor according to the aspect of the invention, it is preferable that each of the first movable electrode fingers is located on one side in the first direction with respect to a paired one of the first stationary electrode fingers, and each of the second movable electrode fingers is located on the other side in the first direction with respect to a paired one of the second stationary electrode fingers.

Therefore, it is possible to perform a differential calculation on a first detection signal obtained between the first stationary electrode fingers and the first movable electrode fingers, and a second detection signal obtained between the second stationary electrode fingers and the second movable electrode fingers. As such, it is possible to cancel noise, and thus, it is possible to detect the physical quantity with higher accuracy.

In the physical quantity sensor according to the aspect of the invention, it is preferable that there are further included a movable member support adapted to support the movable member, and fixed to the base, a first trunk support adapted to support the first trunk, and fixed to the base, and a second trunk support adapted to support the second trunk, and fixed to the base, and a bonding surface of the movable member support bonded to the base, a bonding surface of the first trunk support bonded to the base, and a bonding surface of the second trunk support bonded to the base are disposed side by side in the second direction.

With this configuration, it is possible to dispose the bonding surface of the movable member support bonded to the base, the bonding surface of the first trunk support bonded to the base, and the bonding surface of the second trunk support bonded to the base closer to each other. Therefore, deflection of the base has minimal impact, and it is possible to detect the physical quantity with higher accuracy.

In the physical quantity sensor according to the aspect of the invention, it is preferable that the movable member support is located between the first stationary electrode and the second stationary electrode.

With this configuration, it is possible to more stably support the movable member.

In the physical quantity sensor according to the aspect of the invention, it is preferable that there are further included a first connector adapted to connect the first trunk and the first trunk support to each other, and a second connector adapted to connect the second trunk and the second trunk support to each other, the first connector is located on an opposite side to the movable member support side of the first trunk support, and the second connector is located on an opposite side to the movable member support side of the second trunk support.

With this configuration, it is possible to dispose the bonding surface of the movable member support bonded to the base, the bonding surface of the first trunk support bonded to the base, and the bonding surface of the second trunk support bonded to the base closer to each other. Therefore, deflection of the base has minimal impact, and it is possible to detect the physical quantity with higher accuracy.

In the physical quantity sensor according to the aspect of the invention, it is preferable that the movable member has a frame shape surrounding the stationary electrode.

With this configuration, it is possible to further increase the mass of the movable member. Therefore, the physical quantity can be detected with higher accuracy.

A physical quantity sensor device according to an aspect of the invention includes the physical quantity sensor according to any one of the aspects of the invention described above.

With this configuration, it is possible to appreciate the advantages of the physical quantity sensor described above, and it is possible to obtain the physical quantity sensor device high in reliability.

An electronic apparatus according to an aspect of the invention includes the physical quantity sensor according to any one of the aspects of the invention described above.

With this configuration, it is possible to appreciate the advantages of the physical quantity sensor described above, and it is possible to obtain the electronic apparatus high in reliability.

A vehicle according to an aspect of the invention includes the physical quantity sensor according to any one of the aspects of the invention described above.

With this configuration, it is possible to appreciate the advantages of the physical quantity sensor described above, and it is possible to obtain the vehicle high in reliability.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, a physical quantity sensor, a physical quantity sensor device, an electronic apparatus and a vehicle according to the invention will be described in detail based on the embodiments shown in the accompanying drawings.

First Embodiment

Firstly, a physical quantity sensor according to a first embodiment of the invention will be described.

Figure 1:
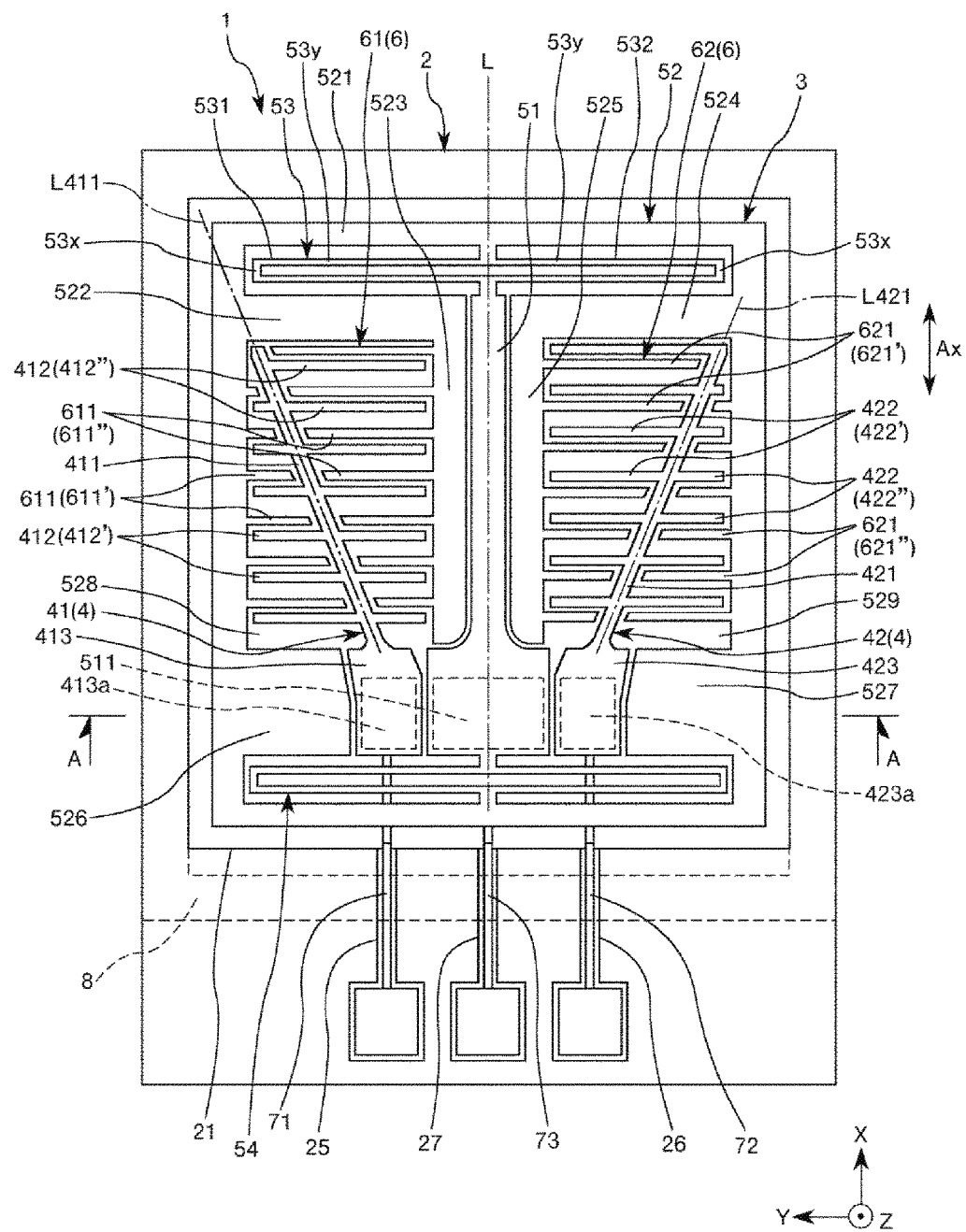
FIG. 1 is a plan view showing a physical quantity sensor according to a first embodiment of the invention.
Figure 2:
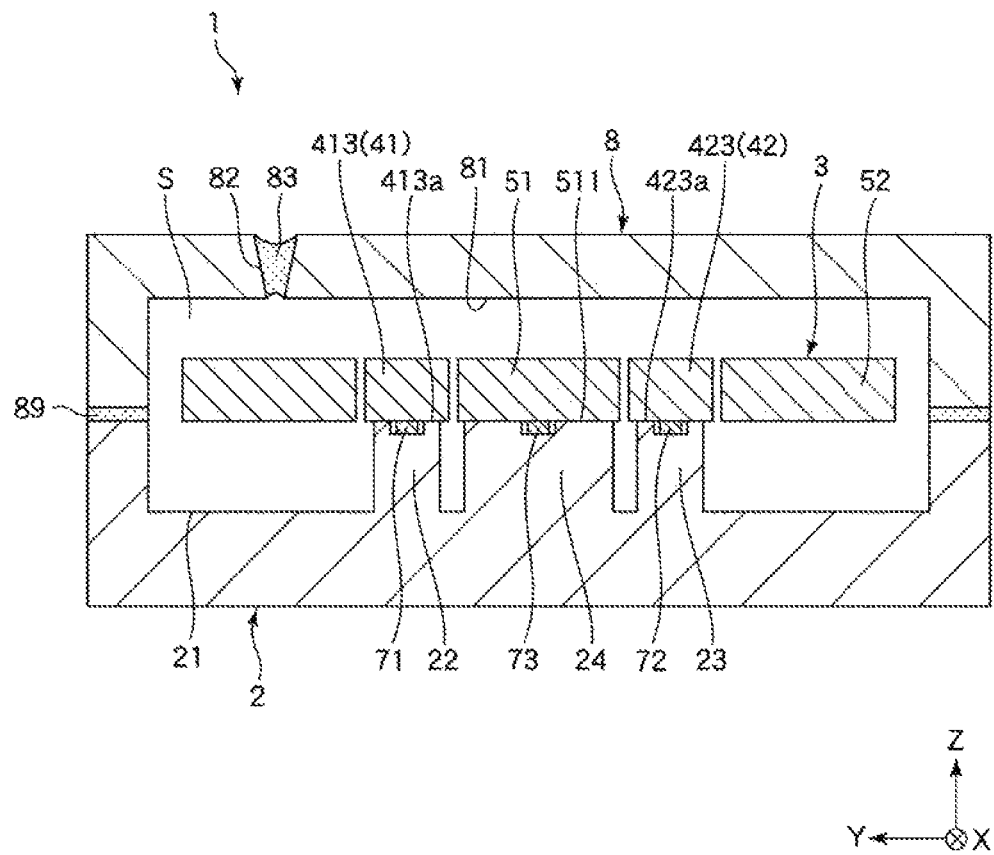
FIG. 2 is a cross-sectional view along the line A-A in FIG. 1.

FIG. 1 is a plan view showing the physical quantity sensor according to the first embodiment of the invention. FIG. 2 is a cross-sectional view along the line A-A in FIG. 1. It should be noted that the front side of the sheet in FIG. 1 and the upper side in FIG. 2 are also referred to as "upper side," and the back side of the sheet in FIG. 1 and the lower side in FIG. 2 are also referred to as "lower side" in the following descriptions for the sake of convenience of explanation. Further, as shown in each of the drawings, the three axes perpendicular to each other are defined as an X axis, a Y axis, and a Z axis, and a direction parallel to the X axis is also referred to as an "X-axis direction," a direction parallel to the Y axis is also referred to as a "Y-axis direction," and a direction parallel to the Z axis is also referred to as a "Z-axis direction." Further, the tip side in the arrow direction of each of the axes is also referred to as a "positive side," and the opposite side is also referred to as a "negative side."

The physical quantity sensor 1 shown in FIG. 1 is an acceleration sensor capable of detecting the acceleration Ax in the X-axis direction. Such a physical quantity sensor 1 has a base 2, and a sensor element 3, which is provided to the base 2 and detects the acceleration Ax (the physical quantity) in the X-axis direction. Further, the sensor element 3 has a stationary electrode 4, a movable member 52, and a movable electrode 6, wherein the stationary electrode 4 is attached to the base 2, the movable member 52 can be displaced in the X-axis direction (a first direction as the detection axis direction of the physical quantity) with respect to the base 2, and the movable electrode 6 is provided to the movable member 52. Further, the stationary electrode 4 has a first stationary electrode 41 and a second stationary electrode 42 arranged side by side along the Y-axis direction (a second direction as a direction crossing ("perpendicular to" in the present embodiment) the detection axis). Further, the first stationary electrode 41 has a first trunk 411 (e.g., a suspension beam), and a plurality of first stationary electrode fingers 412 disposed on both sides in the Y-axis direction (a second direction) of the first trunk 411, and being longitudinally extended in the second direction. Further, the second stationary electrode 42 has a second trunk 421, and a plurality of second stationary electrode fingers 422 disposed on both sides in the Y-axis direction (the second direction) from the second trunk 421, and being longitudinally extended in the second direction. Further, the movable electrode 6 has a first movable electrode 61 and a second movable electrode 62 arranged side by side along the Y-axis direction (the second direction). Further, at least a part of the first movable electrode 61 has a plurality of first movable electrode fingers 611 located on both sides in the Y-axis direction (the second direction) of the first trunk 411, and opposed to the first stationary electrode fingers 412 in the X-axis direction (the first direction) being longitudinally extended in the second direction. Further, at least a part of the second movable electrode 62 has a plurality of second movable electrode fingers 621 located on both sides in the Y-axis direction (the second direction) of the second trunk 421, and opposed to the second stationary electrode fingers 422 in the X-axis direction (the first direction) being longitudinally extended in the second direction. By adopting such a configuration, it is possible to shorten the first and second stationary electrode fingers 412, 422 and the first and second movable electrode fingers 611, 621 while keeping the capacitance between the first movable electrode fingers 611 and the first stationary electrode fingers 412 and the capacitance between the second movable electrode fingers 621 and the second stationary electrode fingers 422 sufficiently high. Therefore, the physical quantity sensor 1 is obtained, which has the electrode fingers 412, 422, 611, 621 that are hard to damage, and has excellent impact resistance. Such a physical quantity sensor 1 will hereinafter be described in detail.

As shown in FIG. 1, the physical quantity sensor 1 has the base 2, the sensor element 3, and a lid 8 bonded to the base 2 so as to cover the sensor element 3.

Base

As shown in FIG. 1, the base 2 has a rectangular plate shape. Further, the base 2 has a recess 21 opening on the upper surface side. Further, in the planar shape viewed from the Z-axis direction, the recess 21 is formed to be larger than the sensor element 3 so as to accommodate the sensor element 3 inside. The recess 21 functions as a clearance for preventing the sensor element 3 and the base 2 from having contact with each other.

Further, as shown in FIG. 2, the base 2 has three projecting mounts (posts or pedestals) 22, 23, 24 on the bottom surface of the recess 21. Further, the first stationary electrode 41 is bonded to the mount 22, the second stationary electrode 42 is bonded to the mount 23, and the movable member support 51 is bonded to the mount 24.

Further, as shown in FIG. 1, the base 2 has grooves 25, 26, 27 opening on the upper surface side. Further, one end of each of the grooves 25, 26, 27 is located outside the lid 8, and the other end thereof is connected to the recess 21.

As such a base 2 as described above, it is possible to use a glass substrate formed of a glass material (borosilicate glass such as Pyrex glass) including, for example, alkali metal ions (movable ions). Thus, it is possible to bond the base 2 and the lid 8 to each other with anodic bonding, and it is possible to firmly bond them to each other depending on the constituent material of the lid 8. Further, since the base 2 having a light transmissive property can be obtained, it is possible to view the state of the sensor element 3 via the base 2 from the outside of the physical quantity sensor 1.

It should be noted that the base 2 is not limited to the glass substrate, but it is also possible to use, for example, a silicon substrate or a ceramic substrate. It should be noted that in the case of using the silicon substrate, from the viewpoint of preventing a short circuit, it is preferable to use a highly-resistive silicon substrate, or to use a silicon substrate provided with a silicon oxide film (an insulating oxide) formed on the surface using thermal oxidation or the like.

Further, as shown in FIG. 1, the grooves 25, 26, 27 are respectively provided with interconnections 71, 72, 73. Further, one end of the interconnection 71 in the groove 25 is exposed to the outside of the lid 8, and functions as a terminal for achieving electrical connection to an external device. Further, as shown in FIG. 2, the other end of the interconnection 71 is laid up to the mount 22 via the recess 21. Further, the interconnection 71 is electrically connected to the first stationary electrode 41 on the mount 22.

Further, as shown in FIG. 1, one end of the interconnection 72 in the groove 26 is exposed to the outside of the lid 8, and functions as a terminal for achieving electrical connection to the external device. Further, as shown in FIG. 2, the other end of the interconnection 72 is laid up to the mount 23 via the recess 21. Further, the interconnection 72 is electrically connected to the second stationary electrode 42 on the mount 23.

Further, as shown in FIG. 1, one end of the interconnection 73 in the groove 27 is exposed to the outside of the lid 8, and functions as a terminal for achieving electrical connection to the external device. Further, as shown in FIG. 2, the other end of the interconnection 73 is laid up to the mount 24 via the recess 21. Further, the interconnection 73 is electrically connected to the movable member support 51 on the mount 24.

The interconnections 71, 72, 73 are not particularly limited, but there can be cited a metal material such as gold (Au), silver (Ag), platinum (Pt), palladium (Pd), iridium (Ir), copper (Cu), aluminum (Al), nickel (Ni), titanium (Ti), or tungsten (W), alloys including any of these metal materials, and a transparent conductive material of the oxide group such as indium tin oxide (ITO), indium zinc oxide (IZO), ZnO, or IGZO, and it is possible to use one of these materials or two or more thereof in combination (e.g., as a stacked body formed of two or more layers).

Lid

As shown in FIG. 1, the lid 8 has a rectangular plate shape. Further, as shown in FIG. 2, the lid 8 has a recess 81 opening on the lower surface side. Further, the lid 8 is bonded to the base 2 so as to house the sensor element 3 in the recess 81. Further, the lid 8 and the base 2 form a housing space S for housing the sensor element 3.

Further, as shown in FIG. 2, the lid 8 has a communication hole 82 for allowing communication between the inside and the outside of the housing space S, and it is possible to replace the atmosphere in the housing space S with desired atmosphere via the communication hole 82. Further, a sealing member 83 is disposed in the communication hole 82, and the sealing member 83 seals the communication hole 82.

The sealing member 83 is not particularly limited providing the communication hole 82 can be sealed, there can be used, for example, a variety of types of alloys such as a gold (Au)/tin (Sn) group alloy, a gold (Au)/germanium (Ge) group alloy, or a gold (Au)/aluminum (Al) group alloy, a glass material such as low-melting-point glass, and so on.

It is preferable for the housing space S to be filled with an inert gas such as nitrogen, helium, or argon, and provided with roughly atmospheric pressure at the operating temperature (in a range of −40° C. through 80° C.). By providing the atmospheric pressure to the housing space S, the viscous resistance increases to exert a damping effect, and it is possible to promptly converge (stop) the vibration of the movable member 52. Therefore, the detection accuracy of the acceleration Ax of the physical quantity sensor 1 is improved.

The lid 8 is formed of a silicon substrate in the present embodiment. It should be noted that the lid 8 is not limited to the silicon substrate, but it is also possible to use, for example, a glass substrate or a ceramic substrate. Further, the bonding method of the base 2 and the lid 8 is not particularly limited, but can appropriately be selected in accordance with the materials of the base 2 and the lid 8. However, there can be cited, for example, anodic bonding, activation bonding for bonding the bonding surfaces activated by irradiation with plasma, bonding with a bonding material such as glass frit, and diffusion bonding for bonding metal films deposited on the upper surface of the base 2 and the lower surface of the lid 8 to each other.

As shown in FIG. 2, in the present embodiment, the base 2 and the lid 8 are bonded to each other via glass frit (low-melting-point glass) as an example of the bonding material. In the state of overlapping the base 2 and the lid 8 with each other, the inside and the outside of the housing space S can communicate with each other via the grooves 25, 26, 27. However, by using the glass frit 89, it is possible to bond the base 2 and the lid 8 to each other, and at the same time seal the grooves 25, 26, 27, and thus, it is possible to more easily airtightly seal the housing space S. It should be noted that in the case of bonding the base 2 and the lid 8 to each other using anodic bonding or the like (the bonding method unable to seal the grooves 25, 26, 27), the grooves 25, 26, 27 can be blocked with an $SiO_2$ film formed by, for example, the CVD method using tetraethoxysilane (TEOS).

Sensor Element

As shown in FIG. 1, the sensor element 3 has the stationary electrode 4, the movable member support 51, the movable member 52, springs 53, 54, and a movable electrode 6, wherein the stationary electrode 4 is fixed to the base 2, the movable member support 51 is fixed to the base 2, the movable member 52 can be replaced in the X-axis direction with respect to the movable member support 51, the springs 53, 54 connect the movable member support 51 and the movable member 52 to each other, and the movable electrode 6 is provided to the movable member 52. Among these, the movable member support 51, the movable member 52, the springs 53, 54, and the movable electrode 6 are formed integrally. Such a sensor element 3 can be formed by, for example, patterning the silicon substrate doped with impurities such as phosphorus (P) or boron (B). Further, the sensor element 3 is bonded to the base 2 (the mounts 22, 23, 24) with anodic bonding. However, the material of the sensor element 3 and the bonding method of the sensor element 3 to the base 2 are not particularly limited.

As shown in FIG. 1, the movable member support 51 (support beam) has an elongated shape extending in the X-axis direction. Further, the movable member support 51 has a bonding surface 511 at the end on the negative side in the X-axis direction, wherein the bonding surface 511 is bonded to the mount 24. It should be noted that in the present embodiment, the movable member support 51 has an elongated shape extending in the X-axis direction, but the shape of the movable member support 51 is not particularly limited providing the function can be obtained. Further, in the following description, an imaginary axis dividing the movable member support 51 into two equal parts in the Y-axis direction in a plan view viewed from the Z-axis direction is defined as a central axis L.

Such a movable member support 51 is located between the first stationary electrode 41 and the second stationary electrode 42. Thus, it is possible to dispose the movable member support 51 in a central part of the movable member 52, and thus it is possible to more stably support the movable member 52.

As shown in FIG. 1, the movable member 52 includes a frame having a frame shape in the plan view viewed from the Z-direction, and surrounds the movable member support 51, the springs 53, 54, and the first and second stationary electrodes 41, 42. In other words, the movable member 52 includes the frame having the frame shape surrounding the stationary electrode 4. Thus, it is possible to further increase the mass of the movable member 52. Therefore, it is possible to further improve the sensitivity to thereby detect the physical quantity with high accuracy.

Further, the movable member 52 has a first opening 528 (a first cutout) and a second opening 529 (a second cutout), wherein the first stationary electrode 41 is disposed inside the first opening 528, and the second stationary electrode 42 is disposed inside the second opening 529. Further, the first and second openings 528, 529 are arranged side by side in the Y-axis direction. Such a movable member 52 is symmetrical about the central axis L.

In the more specific description of the shape of the movable member 52, the movable member 52 a frame 521, a first Y-axis extending cross bar 522, a first X-axis extending return arm 523, a second Y-axis extending cross bar 524, and a second X-axis extending return arm 525, wherein the frame 521 surrounds the movable member support 51, the springs 53, 54, and the first and second stationary electrodes 41, 42, the first Y-axis extending cross bar 522 is located on the positive side in the X-axis direction of the first opening 528 and extends from the frame 521 toward the negative side in the Y-axis direction, the first X-axis extending return arm 523 extends from a tip of the first Y-axis extending cross bar 522, the second Y-axis extending cross bar 524 is located on the positive side in the X-axis direction of the second opening 529 and extends from the frame 521 toward the positive side in the Y-axis direction, and the second X-axis extending return arm 525 extends from a tip of the second Y-axis extending cross bar 524 toward the negative side in the X-axis direction. Further, the first and second Y-axis extending cross bars 522, 524 are each disposed in the vicinity of the spring 53, and are each arranged along the Y-axis direction (the extending direction of a spring element 531) of the spring 53, and the first and second X-axis extending return arms 523, 525 are each disposed in the vicinity of the movable member support 51 and are each arranged along the movable member support 51.

In such a configuration, the first Y-axis extending cross bar 522 and the first X-axis extending return arm 523 function as a support for supporting the first movable electrode fingers 611, and the second Y-axis extending cross bar 524 and the second X-axis extending return arm 525 function as a support for supporting the second movable electrode fingers 621.

Further, the movable member 52 has a first tab 526 projecting from the frame 521 toward the inside of the first opening 528 so as to fill in the excess space of the first opening 528, and has a second tab 527 projecting from the frame 521 toward the inside of the second opening 529 so as to fill in the excess space of the second opening 529. By providing the first and second tabs 526, 527 as described above, it is possible to make the mass of the movable member 52 larger without increasing the size of the movable member 52. Therefore, the sensitivity is improved, and the physical quantity sensor 1 high in sensitivity is obtained.

Further, the springs 53, 54 are elastically deformable, and by the springs 53, 54 deforming elastically, it is possible to displace the movable member 52 in the X-axis direction with respect to the movable member support 51. As shown in FIG. 1, the spring 53 connects an end on the positive side in the X-axis direction of the movable member 52 and an end on the positive side in the X-axis direction of the movable member support 51 to each other, and the spring 54 connects an end on the negative side in the X-axis direction of the movable member 52 and an end on the negative side in the X-axis direction of the movable member support 51 to each other. Thus, it is possible to support the movable member 52 on both sides in the X-axis direction, and therefore, the posture and the behavior of the movable member 52 are stabilized. Therefore, it is possible to reduce unwanted vibrations to thereby detect the acceleration Ax with higher accuracy.

Further, the spring 53 has a pair of spring elements 531, 532 arranged side by side in the Y-axis direction. Further, the pair of spring elements 531, 532 each have a shape meandering in the Y-axis direction, and are formed symmetrically about the central axis L. Such a spring 53 has a part $53y$ extending longer in the Y-axis direction and a part $53x$ extending shorter in the X-axis direction. It should be noted that the configuration of the spring 54 is substantially the same as the configuration of the spring 53.

By forming the springs 53, 54 to have a shape longer in the Y-axis direction perpendicular to the X-axis direction as the detection axis than in the X-axis direction as described above, it is possible to reduce the displacement (in particular the rotational displacement around the Z axis) in a direction other than the X-axis direction (the detection axis direction) of the movable member 52 when the acceleration Ax is applied. Therefore, it is possible to reduce the unwanted vibrations to thereby detect the acceleration Ax with higher accuracy. It should be noted that the configuration of the springs 53, 54 is not particularly limited providing the function thereof can be obtained.

Further, as shown in FIG. 1, the stationary electrode 4 has the first stationary electrode 41 located in the first opening 528, and the second stationary electrode 42 located in the second opening 529. These first and second stationary electrodes 41, 42 are arranged side by side in the Y-axis direction.

Further, the first stationary electrode 41 has a first trunk support 413, the first trunk 411, and the plurality of first stationary electrode fingers 412, wherein the first trunk support 413 is fixed to the base 2, the first trunk 411 is supported by the first trunk support 413, and the plurality of first stationary electrode fingers 412 extends from the first trunk 411 toward both sides in the Y-axis direction. It should be noted that the first trunk support 413, the first trunk 411, and the first stationary electrode fingers 412 are formed integrally.

Further, the first trunk support 413 has a bonding surface 413*a* bonded to the mount 22. It should be noted that the bonding surface 413*a* is disposed so as to be biased toward the negative side in the X-axis direction of the first trunk support 413.

Further, the first trunk 411 has an elongated rod shape, and has one end connected to the first trunk support 413, and is thus supported by the first trunk support 413. Further, the first trunk 411 is longitudinally extended in a tilted direction with respect to each of the X axis and the Y axis in a plan view viewed from the Z-axis direction. More specifically, the first trunk 411 is tilted so that the separation distance from the central axis L increases toward the tip side thereof. By adopting such an arrangement, it becomes easy to dispose the first trunk support 413 in the vicinity of the movable member support 51.

It should be noted that the tilt of the axis L411 of the first trunk 411 with respect to the X axis is not particularly limited, but is preferably no smaller than 10° and no larger than 45°, and is more preferably no smaller than 10° and no larger than 30°. Thus, it is possible to reduce the spread of the first stationary electrode 41 in the Y-axis direction, and thus, it is possible to achieve the reduction in size of the sensor element 3.

Further, the first stationary electrode fingers 412 extend from the first trunk 411 toward both sides in the Y-axis direction. Specifically, the first stationary electrode fingers 412 have the first stationary electrode fingers 412' located on the positive side in the Y-axis direction of the first trunk 411, and the first stationary electrode fingers 412" located on the negative side in the Y-axis direction. Further, the plurality of first stationary electrode fingers 412' and the plurality of first stationary electrode fingers 412" are each disposed along the X-axis direction at intervals.

Further, the lengths (the lengths in the Y-axis direction) of the first stationary electrode fingers 412' descend toward the positive side in the X-axis direction. Further, the tips of the first stationary electrode fingers 412' are located on the same straight line along the X-axis direction. In contrast, the lengths (the lengths in the Y-axis direction) of the first stationary electrode fingers 412" ascend toward the positive side in the X-axis direction. Further, the tips of the first stationary electrode fingers 412" are located on the same straight line along the X-axis direction. Further, the total length of the first stationary electrode finger 412' and the first stationary electrode finger 412" arranged side by side in the Y-axis direction is roughly the same.

Further, the second stationary electrode 42 has a second trunk support 423, the second trunk 421, and the plurality of second stationary electrode fingers 422, wherein the second trunk support 423 is fixed to the base 2, the second trunk 421 is supported by the second trunk support 423, and the plurality of second stationary electrode fingers 422 extends from the second trunk 421 toward both sides in the Y-axis direction. It should be noted that the second trunk support 423, the second trunk 421, and the second stationary electrode fingers 422 are formed integrally.

Further, the second trunk support 423 has a bonding surface 423*a* bonded to the upper surface of the mount 23. It should be noted that the bonding surface 423*a* is disposed so as to be biased toward the negative side in the X-axis direction of the second trunk support 423.

Further, the second trunk 421 has an elongated rod shape, and has one end connected to the second trunk support 423, and is thus supported by the second trunk support 423. Further, the second trunk 421 is longitudinally extended in a tilted direction with respect to each of the X axis and the Y axis in the plan view viewed from the Z-axis direction. More specifically, the second trunk 421 is tilted so that the separation distance from the central axis L increases toward the tip side thereof. By adopting such an arrangement, it becomes easy to dispose the second trunk support 423 in the vicinity of the movable member support 51.

It should be noted that the tilt of the axis L421 of the second trunk 421 with respect to the X axis is not particularly limited, but is preferably no smaller than 10° and no larger than 45°, and is more preferably no smaller than 10° and no larger than 30°. Thus, it is possible to reduce the spread of the second stationary electrode 42 in the Y-axis direction, and thus, it is possible to achieve the reduction in size of the sensor element 3.

Further, the second stationary electrode fingers 422 extend from the second trunk 421 toward both sides in the Y-axis direction. In other words, the second stationary electrode fingers 422 have the second stationary electrode fingers 422' located on the positive side in the Y-axis direction of the second trunk 421, and the second stationary electrode fingers 422" located on the negative side in the Y-axis direction. Further, the plurality of second stationary electrode fingers 422' and the plurality of second stationary electrode fingers 422" are each disposed along the X-axis direction at intervals.

Further, the lengths (the lengths in the Y-axis direction) of the second stationary electrode fingers 422' ascend toward the positive side in the X-axis direction. Further, the tips of the second stationary electrode fingers 422' are located on the same straight line along the X-axis direction. In contrast, the lengths (the lengths in the Y-axis direction) of the second stationary electrode fingers 422" descend toward the positive side in the X-axis direction. Further, the tips of the second stationary electrode fingers 422" are located on the same straight line along the X-axis direction. Further, the total length of the second stationary electrode finger 422' and the second stationary electrode finger 422" arranged side by side in the Y-axis direction is roughly the same.

The first stationary electrode 41 and the second stationary electrode 42 are hereinabove described. The shapes and the arrangement of such first and second stationary electrodes 41, 42 are line-symmetric about the central axis L (except the fact that the first stationary electrode fingers 412 and the second stationary electrode fingers 422 are shifted from each other in the X-axis direction). In particular in the present embodiment, the first and second trunks 411, 421 each extend in the tilted direction with respect to the X axis so that the separation distance from the central axis L gradually increases toward the tip side. By adopting such an arrangement, it is possible to dispose the bonding surface 413a of the first trunk support 413 and the bonding surface 423a of the second trunk support 423 closer to the bonding surface 511 of the movable member support 51. Therefore, it is possible to more effectively reduce the difference in displacement in the Z-axis direction between the movable member 52 and the stationary electrode 4 occurring when warpage or deflection occurs in the base 2 due to heat, residual stress, or the like, specifically the difference in displacement in the Z-axis direction between the first movable electrode fingers 611 and the first stationary electrode fingers 412, and the difference in displacement in the Z-axis direction between the second movable electrode fingers 621 and the second stationary electrode fingers 422.

In particular in the present embodiment, the bonding surface 413a of the first trunk support 413, the bonding surface 423a of the second trunk support 423, and the bonding surface 511 of the movable member support 51 are arranged side by side in the Y-axis direction. Thus, it is possible to dispose the bonding surfaces 413a, 423a closer to the bonding surface 511, and thus the advantage described above becomes more pronounced.

Further, as shown in FIG. 1, the movable electrode 6 has the first movable electrode 61 located in the first opening 528, and the second movable electrode 62 located in the second opening 529. These first and second movable electrodes 61, 62 are arranged side by side in the Y-axis direction.

Further, the first movable electrode 61 has the plurality of first movable electrode fingers 611 located on both sides in the Y-axis direction of the first trunk 411, and extending in the Y-axis direction. Specifically, the first movable electrode fingers 611 have the first movable electrode fingers 611' located on the positive side in the Y-axis direction of the first trunk 411, and the first movable electrode fingers 611" located on the negative side in the Y-axis direction. Further, the plurality of first movable electrode fingers 611' and the plurality of first movable electrode fingers 611" are each disposed along the X-axis direction at intervals. Further, the first movable electrode fingers 611' extend from the frame 521 toward the negative side in the Y-axis direction, and the first movable electrode fingers 611" extend from the first X-axis extending return arm 523 toward the positive side in the Y-axis direction.

Further, each of the first movable electrode fingers 611 is located on the positive side in the X-axis direction with respect to corresponding one of the first stationary electrode fingers 412, and is opposed to this first stationary electrode finger 412 with a gap.

Further, the lengths (the lengths in the Y-axis direction) of the first movable electrode fingers 611' descend toward the positive side in the X-axis direction. Further, the tips of the first movable electrode fingers 611' are located on the same straight line along the extending direction of the first trunk 411. In contrast, the lengths (the lengths in the Y-axis direction) of the first movable electrode fingers 611" ascend toward the positive side in the X-axis direction. Further, the tips of the first movable electrode fingers 611" are located on the same straight line along the extending direction of the first trunk 411. Further, the total length of the first movable electrode finger 611' and the first movable electrode finger 611" arranged side by side in the Y-axis direction is roughly the same.

Further, the second movable electrode 62 has the plurality of second movable electrode fingers 621 located on both sides in the Y-axis direction of the second trunk 421, and extending in the Y-axis direction. Specifically, the second movable electrode fingers 621 have the second movable electrode fingers 621' located on the positive side in the Y-axis direction of the second trunk 421, and the second movable electrode fingers 621" located on the negative side in the Y-axis direction. Further, the plurality of second movable electrode fingers 621' and the plurality of second movable electrode fingers 621" are each disposed along the X-axis direction at intervals. Further, the second movable electrode fingers 621' extend from the second X-axis extending return arm 525 toward the negative side in the Y-axis direction, and the second movable electrode fingers 621" extend from the frame 521 toward the positive side in the Y-axis direction.

Further, each of the second movable electrode fingers 621 is located on the negative side in the X-axis direction with respect to corresponding one of the second stationary electrode fingers 422, and is opposed to this second stationary electrode finger 422 with a gap.

Further, the lengths (the lengths in the Y-axis direction) of the second movable electrode fingers 621' ascend toward the positive side in the X-axis direction. Further, the tips of the second movable electrode fingers 621' are located on the same straight line along the extending direction of the second trunk 421. In contrast, the lengths (the lengths in the Y-axis direction) of the second stationary electrode fingers 621" descend toward the positive side in the X-axis direction. Further, the tips of the second movable electrode fingers 621" are located on the same straight line along the extending direction of the second trunk 421. Further, the total length of the second movable electrode finger 621' and the second movable electrode finger 621" arranged side by side in the Y-axis direction is roughly the same.

The first movable electrode 61 and the second movable electrode 62 are hereinabove described. The shapes and the arrangement of such first and second stationary electrodes 61, 62 are line-symmetric about the central axis L (except the fact that the first movable electrode fingers 611 and the second movable electrode fingers 621 are shifted from each other in the X-axis direction).

The configuration of the physical quantity sensor 1 is hereinabove described in detail. When the acceleration Ax is applied to such a physical quantity sensor 1, the movable member 52 is displaced in the X-axis direction while elastically deforming the springs 53, 54 based on the magnitude of the acceleration Ax. Due to such a displacement, the gap between the first movable electrode finger 611 and the first stationary electrode 412, and the gap between the second movable electrode finger 621 and the second stationary electrode finger 422 each vary, and due to the displacement, the capacitance between the first movable electrode finger 611 and the first stationary electrode finger 412, and the capacitance between the second movable electrode finger 621 and the second stationary electrode finger 422 each vary. Therefore, it is possible to detect the acceleration Ax based on the variation in these capacitances.

Here, as described above, each of the first movable electrode fingers 611 is located on the positive side in the X-axis direction with respect to corresponding one of the first stationary electrode fingers 412, and in contrast, each of the second movable electrode fingers 621 is located on the negative side in the X-axis direction with respect to corresponding one of the second stationary electrode fingers 422. In other words, each of the first movable electrode fingers 611 is located on one side in the X-axis direction (the first direction) with respect to a paired one of the first stationary electrode fingers 412, and each of the second movable electrode fingers 621 is located on the other side in the X-axis direction (the first direction) with respect to a paired one of the second stationary electrode fingers 422. Therefore, when the acceleration Ax is applied, the gap between the first movable electrode finger 611 and the first stationary electrode finger 412 contracts and the gap between the second movable electrode finger 621 and the second stationary electrode finger 422 expands, or in contrast, the gap between the first movable electrode finger 611 and the first stationary electrode finger 412 expands and the gap between the second movable electrode finger 621 and the second stationary electrode finger 422 contracts. Therefore, by performing a differential calculation on a first detection signal obtained between the first stationary electrode fingers 412 and the first movable electrode fingers 611, and a second detection signal obtained between the second stationary electrode fingers 422 and the second movable electrode fingers 621, it is possible to cancel noise, and thus, the acceleration Ax can be detected with higher accuracy.

As described above, such a physical quantity sensor 1 as described above has the plurality of first stationary electrode fingers 412 extending from the first trunk 411 toward both sides in the Y-axis direction (the second direction), the plurality of second stationary electrode fingers 422 extending from the second trunk 421 toward both sides in the Y-axis direction (the second direction), the plurality of first movable electrode fingers 611 located on both sides in the Y-axis direction (the second direction) of the first trunk 411 and opposed to the first stationary electrode fingers 412 in the X-axis direction (the first direction), and the plurality of second movable electrode fingers 621 located on both sides in the Y-axis direction (the second direction) of the second trunk 421 and opposed to the second stationary electrode fingers 422 in the X-axis direction (the first direction). By adopting such a configuration, it is possible to shorten the length of each of the electrode fingers 412, 422, 611, 621 while forming the sufficiently high capacitances respectively between the first stationary electrode fingers 412 and the first movable electrode fingers 611, and between the second stationary electrode fingers 422 and the second movable electrode fingers 621. Therefore, there is provided the physical quantity sensor 1 which is capable of exhibiting excellent detection accuracy, and is reduced in damage of the electrode fingers 412, 422, 611, 621, and is capable of exhibiting excellent impact resistance. Further, the damage of the electrode fingers 412, 422, 611, 621 is reduced, the thickness of the electrode fingers 412, 422, 611, 621 can be reduced accordingly, and reduction in size and an increase in sensitivity of the physical quantity sensor 1 can be achieved.

Further, in the physical quantity sensor 1, the first trunk 411 and the second trunk 421 each extend in a tilted direction with respect to the X-axis direction (the first direction) and the Y-axis direction (the second direction). Thus, it is possible to include the shorter first stationary electrode fingers 412 in the plurality of first stationary electrode fingers 412, and it becomes harder to damage the first stationary electrode 41 as a whole. Similarly, it is possible to include the shorter second stationary electrode fingers 422 in the plurality of second stationary electrode fingers 422, and it becomes harder to damage the second stationary electrode 42 as a whole. The same applies to the first movable electrode fingers 611 and the second movable electrode fingers 621. Therefore, the physical quantity sensor 1 is obtained, in which the damage of the electrode fingers 412, 422, 611, 621 is more effectively reduced, and which has more excellent impact resistance.

Further, in the physical quantity sensor 1, the first trunk 411 and the second trunk 421 are tilted toward the respective sides opposite to each other with respect to the X-axis direction (the first direction). Thus, it is possible to dispose the bonding surface 413a of the first trunk support 413 and the bonding surface 423a of the second trunk support 423 closer to the bonding surface 511 of the movable member support 51. Therefore, it is possible to more effectively reduce the difference in displacement in the Z-axis direction between the movable member 52 and the stationary electrode 4 when the warpage or the deflection occurs in the base 2 due to the heat. As a result, for example, the variation in the detection characteristic due to the environmental temperature becomes small, and thus, the physical quantity sensor 1 excellent in temperature characteristic is obtained.

In particular in the present embodiment, there are provided the movable member support 51, the first trunk support 413, and the second trunk support 423, wherein the movable member support 51 is fixed to the base 2, the first trunk support 413 supports the first trunk 411 and is fixed to the base 2, and the second trunk support 423 supports the second trunk 421, and the bonding surface 511 of the movable member support 51 with the base 2, the bonding surface 413a of the first trunk support 413 with the base 2, and the bonding surface 423a of the second trunk support 423 are arranged side by side in the Y-axis direction (the second direction).

Therefore, it is possible to dispose the bonding surface 413a and the bonding surface 423a closer to the bonding surface 511.

Therefore, it is possible to more effectively reduce the difference in displacement in the Z-axis direction between the movable member 52 and the stationary electrode 4 when the warpage or the deflection occurs in the base 2 due to the heat, the residual stress, or the like. As a result, for example, the variation in the detection characteristic due to the environmental temperature becomes smaller, and thus, the physical quantity sensor 1 more excellent in temperature characteristic is obtained.

Further, in the present embodiment, the plurality of first stationary electrode fingers 412 is arranged side by side in the X-axis direction (the first direction). Further, the lengths along the Y-axis direction of the first stationary electrode fingers 412', which are located on the positive side (one side) in the Y-axis direction (the second direction) with respect to the first trunk 411, and are disposed side by side in the X-axis direction, descend toward the positive side (the one side) in the X-axis direction, and in contrast, the lengths along the Y-axis direction of the first stationary electrode fingers 412", which are located on the negative side (the other side) in the Y-axis direction with respect to the first trunk 411, and are disposed side by side in the X-axis direction, ascend toward the positive side in the X-axis direction. Thus, it is possible to decrease the proportion of the elongated (longer in the Y-axis direction) first stationary electrode fingers 412 to the plurality of first stationary electrode fingers 412, and therefore, the first stationary electrode fingers 412 become hard to damage as a whole accordingly. Therefore, it is possible to more effectively avoid damage of the first stationary electrode fingers 412 due to an impact or the like.

Meanwhile, the plurality of second stationary electrode fingers 422 is disposed side by side in the X-axis direction. Further, the lengths along the Y-axis direction of the second stationary electrode fingers 422', which are located on the positive side in the Y-axis direction with respect to the second trunk 421, and are disposed side by side in the X-axis direction, ascend toward the positive side in the X-axis direction, and the lengths along the Y-axis direction of the second stationary electrode fingers 422", which are located on the negative side in the Y-axis direction with respect to the second trunk 421, and are disposed side by side in the X-axis direction, descend toward the positive side in the X-axis direction. Thus, it is possible to decrease the proportion of the elongated (longer in the Y-axis direction) second stationary electrode fingers 422 to the plurality of second stationary electrode fingers 422, and therefore, the second stationary electrode fingers 422 become hard to damage as a whole accordingly. Therefore, it is possible to more effectively avoid damage of the second stationary electrode fingers 422 due to an impact or the like.

Further, in the present embodiment, the plurality of first movable electrode fingers 611 is arranged side by side in the X-axis direction (the first direction). Further, the lengths along the Y-axis direction of the first movable electrode fingers 611', which are located on the positive side (one side) in the Y-axis direction (the second direction) with respect to the first trunk 411, and are disposed side by side in the X-axis direction, descend toward the positive side (the one side) in the X-axis direction, and the lengths along the Y-axis direction of the first movable electrode fingers 611", which are located on the negative side (the other side) in the Y-axis direction with respect to the first trunk 411, and are disposed side by side in the X-axis direction, ascend toward the positive side in the X-axis direction. Thus, it is possible to decrease the proportion of the elongated (longer in the Y-axis direction) first movable electrode fingers 611 to the plurality of first movable electrode fingers 611, and therefore, the first movable electrode fingers 611 become hard to damage as a whole accordingly. Therefore, it is possible to more effectively avoid damage of the first movable electrode fingers 611 due to an impact or the like.

Meanwhile, the plurality of second movable electrode fingers 621 is disposed side by side in the X-axis direction. Further, the lengths along the Y-axis direction of the second movable electrode fingers 621', which are located on the positive side in the Y-axis direction with respect to the second trunk 421, and are disposed side by side in the X-axis direction, ascend toward the positive side in the X-axis direction, and the lengths along the Y-axis direction of the second movable electrode fingers 621", which are located on the negative side in the Y-axis direction with respect to the second trunk 421, and are disposed side by side in the X-axis direction, descend toward the one side in the X-axis direction. Thus, it is possible to decrease the proportion of the elongated (longer in the Y-axis direction) second movable electrode fingers 621 to the plurality of second movable electrode fingers 621, and therefore, the second movable electrode fingers 621 become hard to damage as a whole accordingly. Therefore, it is possible to more effectively avoid damage of the second movable electrode fingers 621 due to an impact or the like.

Second Embodiment

Next, a physical quantity sensor according to a second embodiment of the invention will be described.

Figure 3:
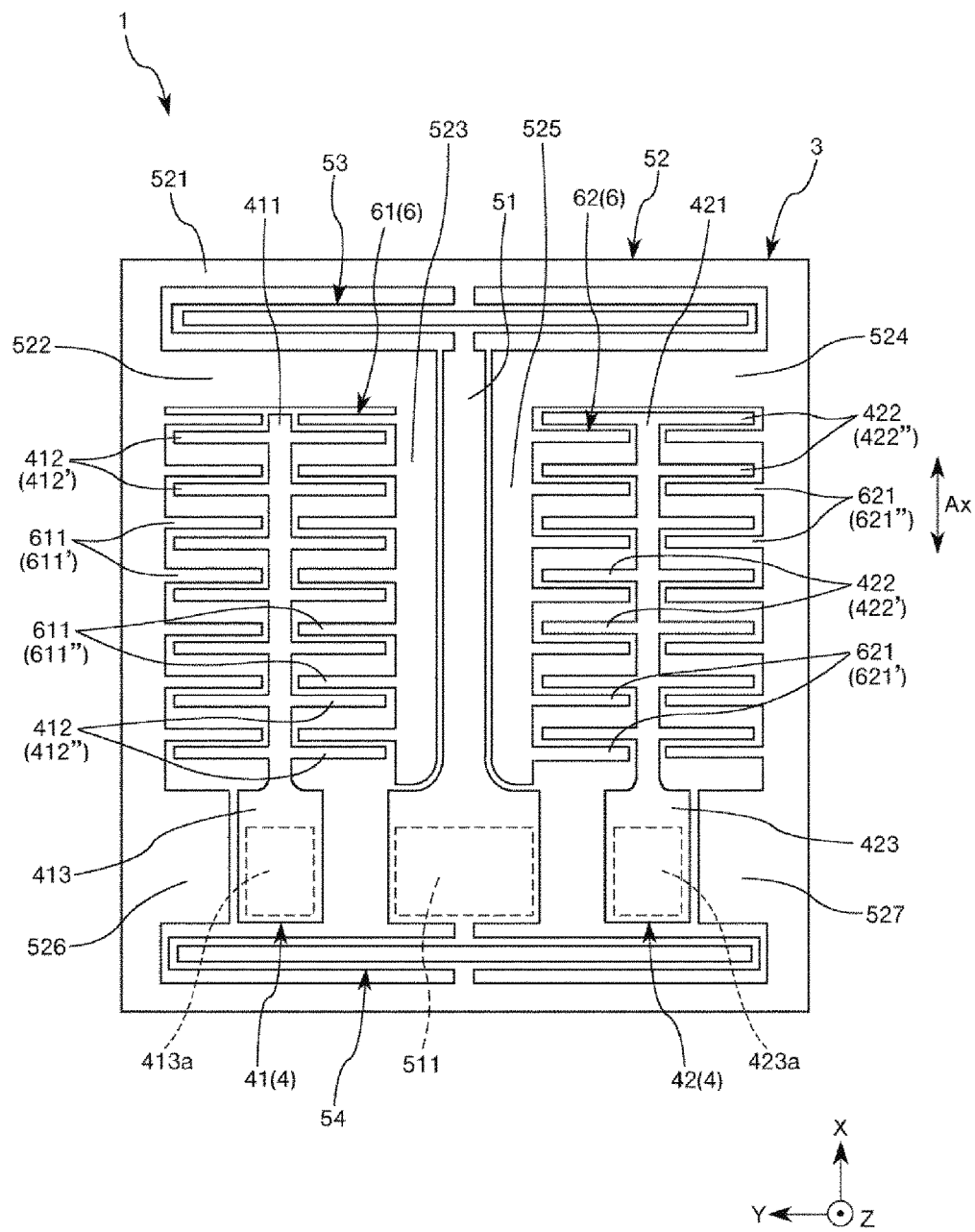
FIG. 3 is a plan view showing a physical quantity sensor according to a second embodiment of the invention.

FIG. 3 is a plan view showing the physical quantity sensor according to the second embodiment of the invention. It should be noted that in FIG. 3, the base and the lid are omitted from the drawing, and the sensor element alone is shown for the sake of convenience of explanation.

The physical quantity sensor 1 according to the present embodiment is substantially the same as the physical quantity sensor 1 according to the first embodiment described above except mainly the fact that the configuration of the sensor element 3 is different.

It should be noted that in the following description, the physical quantity sensor 1 according to the second embodiment will be described with a focus on the difference from the first embodiment described above, and the description of substantially the same issues will be omitted. Further, in FIG. 3, the constituents substantially the same as those of the first embodiment described above are denoted by the same reference symbols.

As shown in FIG. 3, in the physical quantity sensor 1 according to the present embodiment, the first trunk 411 and the second trunk 421 each extend along the X-axis direction. Further, the lengths of the first stationary electrode fingers 412 are made roughly equal to each other, and similarly, the lengths of the second stationary electrode fingers 422 are made roughly equal to each other. Further, the lengths of the first movable electrode fingers 611 are made roughly equal to each other, and similarly, the lengths of the second movable electrode fingers 621 are made roughly equal to each other.

According also to such a second embodiment as described above, substantially the same advantages as in the first embodiment described above can be obtained.

Third Embodiment

Next, a physical quantity sensor according to a third embodiment of the invention will be described.

Figure 4:
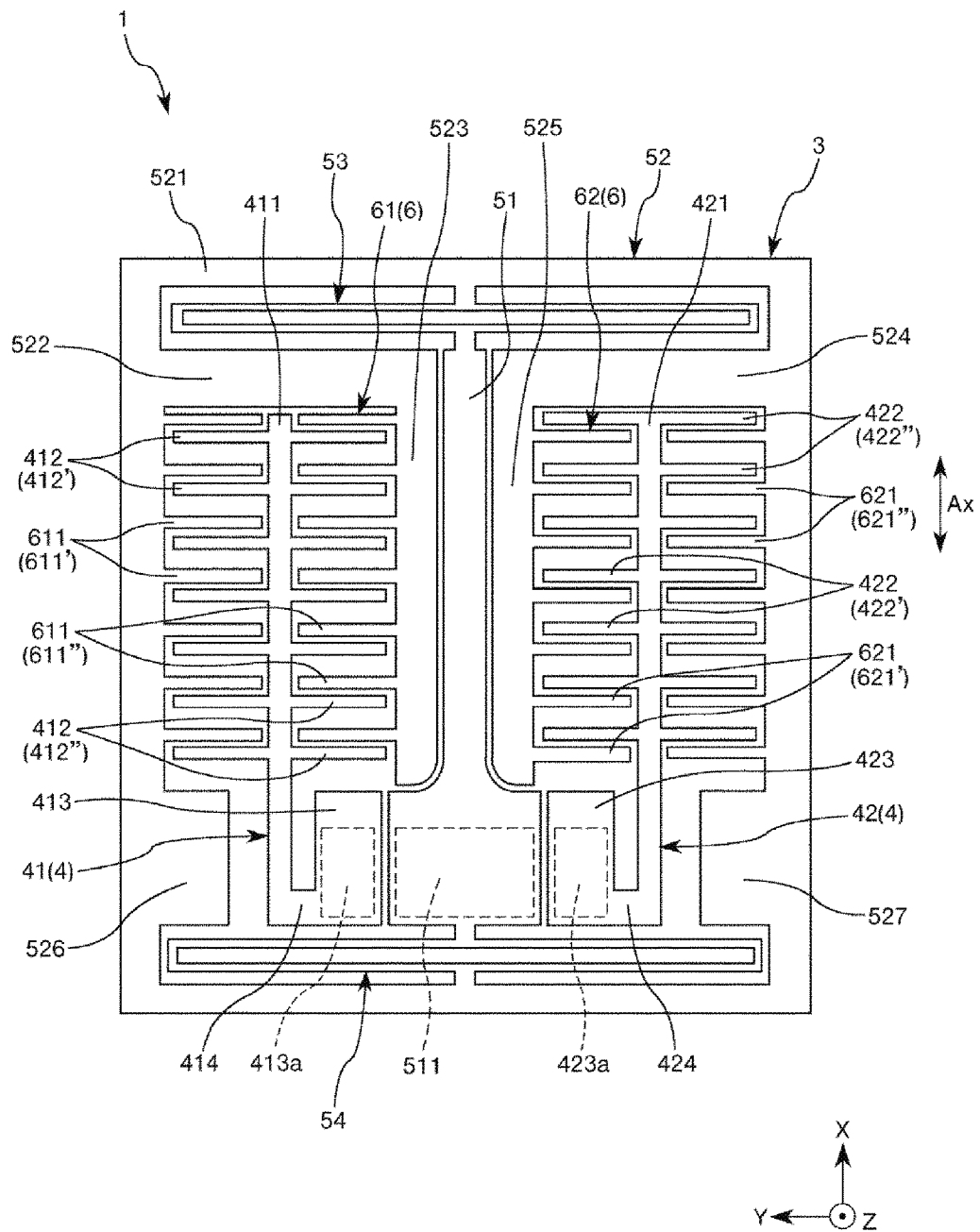
FIG. 4 is a plan view showing a physical quantity sensor according to a third embodiment of the invention.

FIG. 4 is a plan view showing the physical quantity sensor according to the third embodiment of the invention. It should be noted that in FIG. 4, the base and the lid are omitted from the drawing, and the sensor element alone is shown for the sake of convenience of explanation.

The physical quantity sensor 1 according to the present embodiment is substantially the same as the physical quantity sensor 1 according to the second embodiment described above except mainly the fact that the configuration of the sensor element 3 is different.

It should be noted that in the following description, the physical quantity sensor 1 according to the third embodiment will be described with a focus on the difference from the second embodiment described above, and the description of substantially the same issues will be omitted. Further, in FIG. 4, the constituents substantially the same as those of the second embodiment described above are denoted by the same reference symbols.

As shown in FIG. 4, the first stationary electrode 41 further includes a first connector 414 for connecting the first trunk support 413 and the first trunk 411 to each other. Further, the first connector 414 is located on the opposite side to the movable member support 51 with respect to the first trunk support 413. Further, the first connector 414 extends in the Y-axis direction, and is connected to an end on the negative side in the X-axis direction of the first trunk 411.

Similarly, the second stationary electrode 42 further includes a second connector 424 for connecting the second trunk support 423 and the second trunk 421 to each other.

Further, the second connector 424 is located on the opposite side to the movable member support 51 with respect to the second trunk support 423. Further, the second connector 424 extends in the Y-axis direction, and is connected to an end on the negative side in the X-axis direction of the second trunk 421.

According to such a configuration, since the first connector 414 and the second connector 424 are provided, it is possible to dispose the bonding surface 413a of the first trunk support 413 and the bonding surface 423a of the second trunk support 423 closer to the bonding surface 511 of the movable member support 51. Therefore, it is possible to effectively reduce the difference in displacement in the Z-axis direction between the movable member 52 and the stationary electrode 4 occurring when warpage or deflection occurs in the base 2 due to heat, residual stress, or the like, specifically the difference in displacement in the Z-axis direction between the first movable electrode fingers 611 and the first stationary electrode fingers 412, and the difference in displacement in the Z-axis direction between the second movable electrode fingers 621 and the second stationary electrode fingers 422. Therefore, the physical quantity can be detected with higher accuracy.

According also to such a third embodiment as described above, substantially the same advantages as in the first embodiment described above can be obtained.

Fourth Embodiment

Next, a physical quantity sensor according to a fourth embodiment of the invention will be described.

Figure 5:
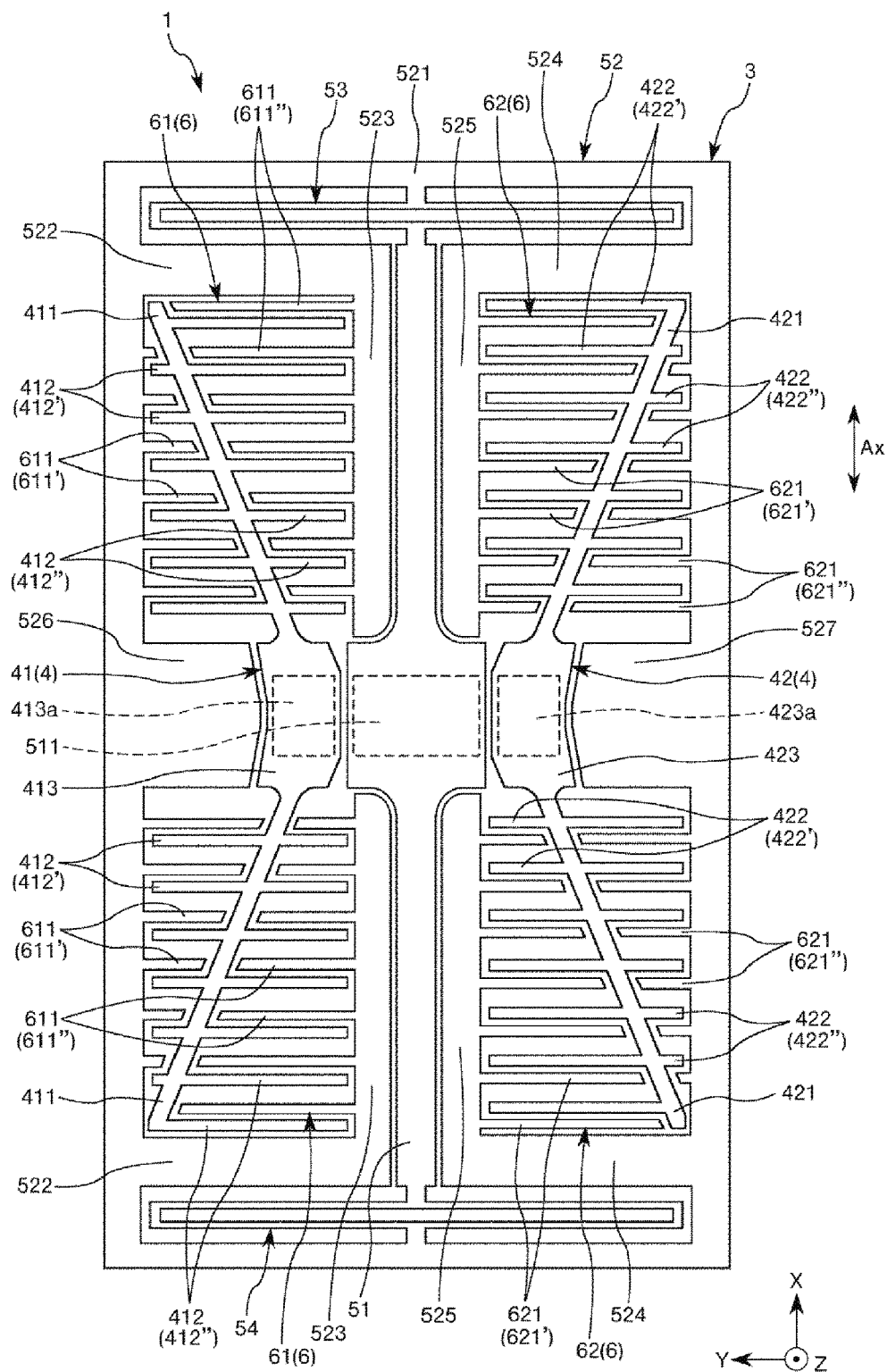
FIG. 5 is a plan view showing a physical quantity sensor according to a fourth embodiment of the invention.
Figure 6:
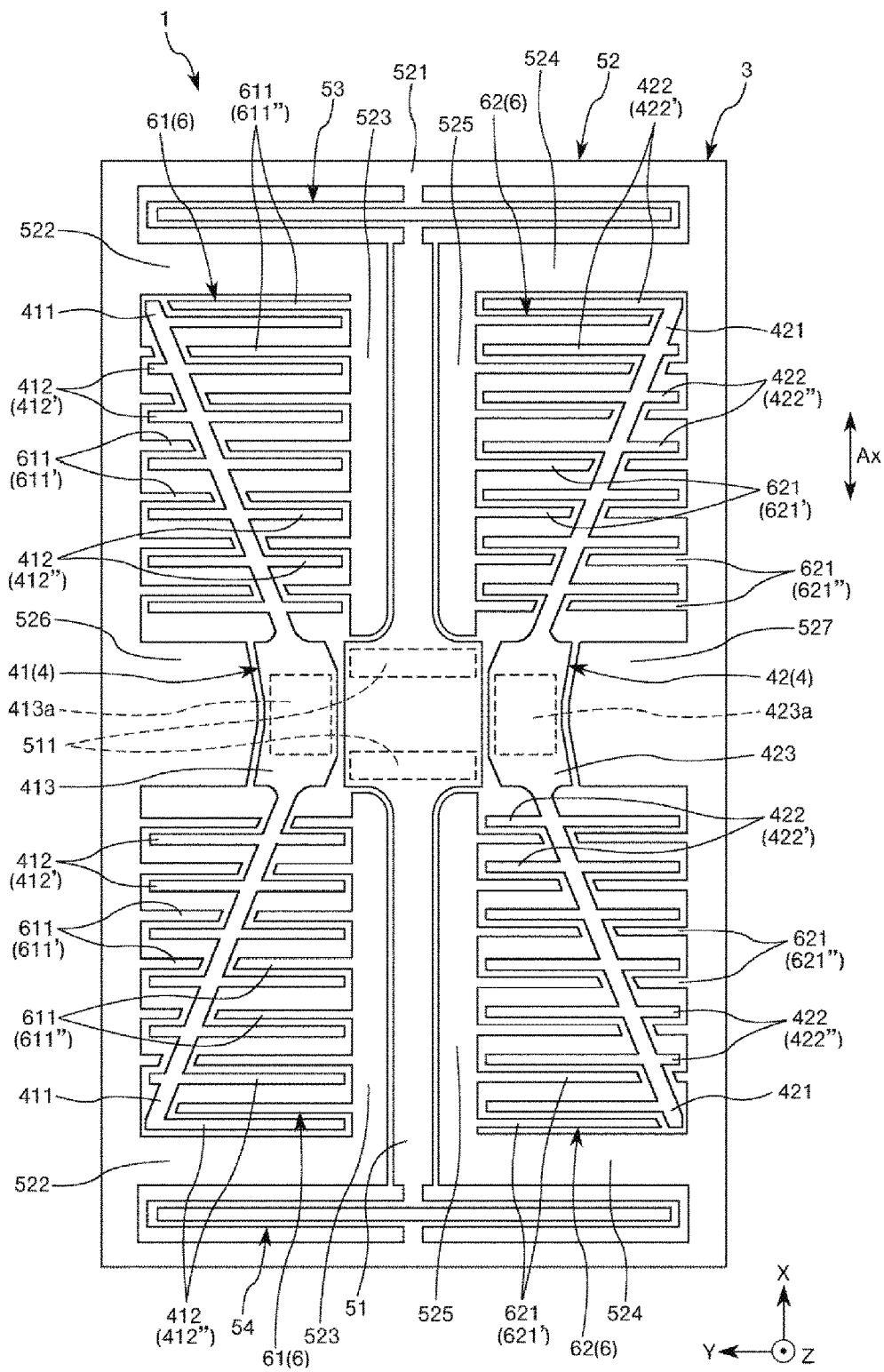
FIG. 6 is a plan view showing a modified example of the physical quantity sensor shown in FIG. 5.

FIG. 5 is a plan view showing the physical quantity sensor according to the fourth embodiment of the invention. FIG. 6 is a plan view showing a modified example of the physical quantity sensor shown in FIG. 5. It should be noted that in each of FIG. 5 and FIG. 6, the base and the lid are omitted from the drawing, and the sensor element alone is shown for the sake of convenience of explanation.

The physical quantity sensor 1 according to the present embodiment is substantially the same as the physical quantity sensor 1 according to the first embodiment described above except mainly the fact that the configuration of the sensor element 3 is different.

It should be noted that in the following description, the physical quantity sensor 1 according to the fourth embodiment will be described with a focus on the difference from the first embodiment described above, and the description of substantially the same issues will be omitted. Further, in FIG. 5 and FIG. 6, the constituents substantially the same as those of the first embodiment described above are denoted by the same reference symbols.

As shown in FIG. 5, the first stationary electrode 41 has a pair of first trunks 411 each extending in a tilted direction with respect to each of the X axis and the Y axis. Further, the pair of first trunks 411 are located on respective sides opposite to each other in the X-axis direction with respect to the first trunk support 413. Specifically, one of the first trunks 411 extends from the first trunk support 413 toward the positive side in the X-axis direction along the tilted direction with respect to the X axis, and the other of the first trunks 411 extends from the first trunk support 413 toward the negative side in the X-axis direction along the tilted direction with respect to the X-axis direction. Further, the pair of first trunks 411 are made line-symmetric about a line parallel to the Y axis. Further, the plurality of first stationary electrode fingers 412 is provided to each of the first trunks 411, and the movable member 52 is provided with the plurality of first movable electrode fingers 611 respectively opposed to the first stationary electrode fingers 412.

Similarly, the second stationary electrode 42 has a pair of second trunks 421 each extending in a tilted direction with respect to each of the X axis and the Y axis. Further, the pair of second trunks 421 are located on respective sides opposite to each other in the X-axis direction with respect to the second trunk support 423. Specifically, one of the second trunks 421 extends from the second trunk support 423 toward the positive side in the X-axis direction along the tilted direction with respect to the X axis, and the other of the second trunks 421 extends from the second trunk support 423 toward the negative side in the X-axis direction along the tilted direction with respect to the X-axis direction. Further, the pair of second trunks 421 are made line-symmetric about a line parallel to the Y axis. Further, the plurality of second stationary electrode fingers 422 is provided to each of the second trunks 421, and the movable member 52 is provided with the plurality of second movable electrode fingers 621 respectively opposed to the second stationary electrode fingers 422.

According to such a configuration as described above, the number of the first and second stationary electrode fingers 412, 422 and the first and second movable electrode fingers 611, 621 can be increased compared to, for example, the first embodiment described above. Therefore, for example, if the lengths of the electrode fingers are equal to those in the first embodiment described above, it is possible to increase the capacitance between the first movable electrode fingers 611 and the first stationary electrode fingers 412 and the capacitance between the second movable electrode fingers 621 and the second stationary electrode fingers 422. Further, since the variation in capacitance when the acceleration Ax is applied also increases accordingly, the sensitivity is improved, and the acceleration Ax can be detected with higher accuracy. In another respect, for example, if the value of the capacitance is the same as in the first embodiment described above, the electrode fingers 412, 422, 611, 621 can be shortened accordingly, and thus, the electrode fingers 412, 422, 611, 621 become harder to be damaged.

Further, the bonding surfaces 511 of the movable member support 51 with the base 2 are located in the central part in the X-axis direction of the movable member support 51. Further, the bonding surfaces 511 are disposed at two places in the central part of the movable member support 51 across the centroid thereof from each other. By adopting such an arrangement, it is possible to dispose the bonding surface 413a of the first stationary electrode 41 with the base 2 and the bonding surface 423a of the second stationary electrode 42 with the base 2 close to the respective bonding surfaces 511. Therefore, it is possible to more effectively reduce the difference in displacement in the Z-axis direction between the movable member 52 and the stationary electrode 4 when the warpage or the deflection occurs in the base 2 due to the heat, the residual stress, or the like.

It should be noted that the arrangement of the bonding surfaces 511 is not particularly limited, but it is also possible to dispose the bonding surface 511 at one place overlapping the centroid of the movable member support 51 as shown, for example, in FIG. 6. Further, apart of the movable member support 51 located between the two bonding surfaces 511 is not necessarily required to form one part, but can also be divided. It is also possible to connect the first X-axis extending return arm 523 and the second X-axis extending return arm 525 to each other in a gap formed by the division.

According also to such a fourth embodiment as described above, substantially the same advantages as in the first embodiment described above can be obtained.

Fifth Embodiment

Next, a physical quantity sensor according to a fifth embodiment of the invention will be described.

Figure 7:
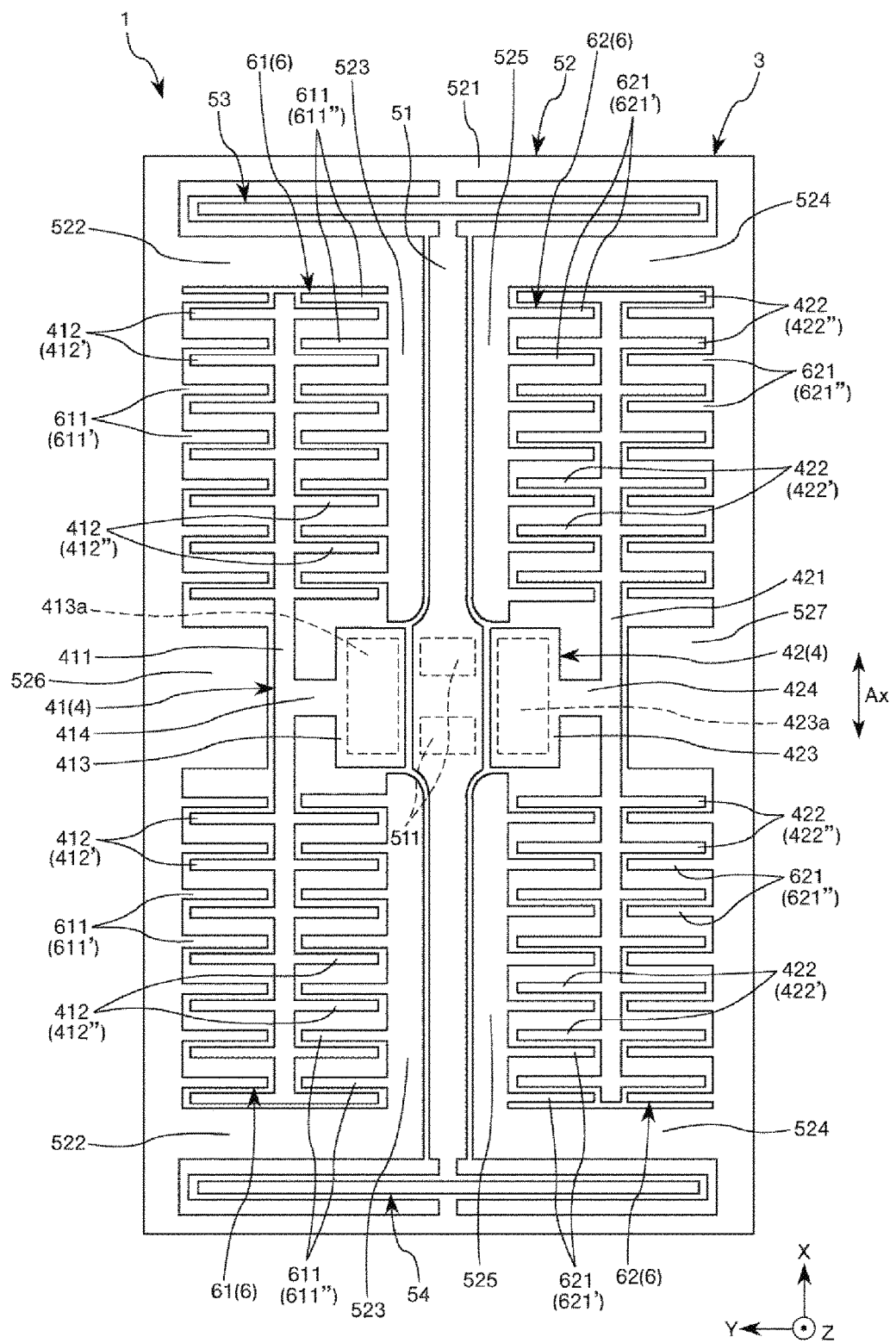
FIG. 7 is a plan view showing a physical quantity sensor according to a fifth embodiment of the invention.

FIG. 7 is a plan view showing the physical quantity sensor according to the fifth embodiment of the invention. It should be noted that in FIG. 7, the base and the lid are omitted from the drawing, and the sensor element alone is shown for the sake of convenience of explanation.

The physical quantity sensor 1 according to the present embodiment is substantially the same as the physical quantity sensor 1 according to the third embodiment described above except mainly the fact that the configuration of the sensor element 3 is different.

It should be noted that in the following description, the physical quantity sensor 1 according to the fifth embodiment will be described with a focus on the difference from the third embodiment described above, and the description of substantially the same issues will be omitted. Further, in FIG. 7, the constituents substantially the same as those of the first embodiment described above are denoted by the same reference symbols.

As shown in FIG. 7, the first stationary electrode 41 includes the first connector 414 for connecting the first trunk support 413 and the first trunk 411 to each other. Further, the first connector 414 is located on the opposite side to the movable member support 51 with respect to the first trunk support 413. Further, the first connector 414 extends in the Y-axis direction, and is connected to a central part in the X-axis direction of the first trunk 411. Further, the first stationary electrode fingers 412 are disposed on each of one end side (the positive side in the X-axis direction) and the other end side (the negative side in the X-axis direction) of the first trunk 411. Therefore, the first stationary electrode fingers 412 are disposed throughout roughly the entire area in the extending direction except the connection part with the first connector 414.

Similarly, the second stationary electrode 42 includes the second connector 424 for connecting the second trunk support 423 and the second trunk 421 to each other. Further, the second connector 424 is located on the opposite side to the movable member support 51 with respect to the second trunk support 423. Further, the second connector 424 extends in the Y-axis direction, and is connected to a central part in the X-axis direction of the second trunk 421. Further, the second stationary electrode fingers 422 are disposed on each of one end side (the positive side in the X-axis direction) and the other end side (the negative side in the X-axis direction) of the second trunk 421. Therefore, the second stationary electrode fingers 422 are disposed throughout roughly the entire area in the extending direction except the connection part with the second connector 424.

According to such a configuration, since the first connector 414 and the second connector 424 are provided, it is possible to dispose the bonding surface 413a of the first trunk support 413 and the bonding surface 423a of the second trunk support 423 closer to the bonding surface 511 of the movable member support 51. Therefore, it is possible to effectively reduce the difference in displacement in the Z-axis direction between the movable member 52 and the stationary electrode 4 occurring when warpage or deflection occurs in the base 2 due to the heat, the residual stress, or the like, specifically the difference in displacement in the Z-axis direction between the first movable electrode fingers 611 and the first stationary electrode fingers 412, and the difference in displacement in the Z-axis direction between the second movable electrode fingers 621 and the second stationary electrode fingers 422. Therefore, the physical quantity can be detected with higher accuracy.

Further, the number of the first and second stationary electrode fingers 412, 422 and the first and second movable electrode fingers 611, 621 can be increased compared to, for example, the second embodiment described above. Therefore, for example, if the lengths of the electrode fingers are equal to those in the first embodiment described above, it is possible to increase the capacitance between the first movable electrode fingers 611 and the first stationary electrode fingers 412 and the capacitance between the second movable electrode fingers 621 and the second stationary electrode fingers 422, and thus, the sensitivity is improved, and it is possible to detect the acceleration Ax with higher accuracy. In another respect, for example, if the value of the capacitance is the same as in the first embodiment described above, the electrode fingers 412, 422, 611, 621 can be shortened accordingly, and thus, the electrode fingers 412, 422, 611, 621 become harder to be damaged.

Further, the bonding surfaces 511 of the movable member support 51 with the base 2 are located in the central part in the X-axis direction of the movable member support 51. Further, the bonding surfaces 511 are disposed at two places (the two places arranged in the X-axis direction) in the central part of the movable member support 51 across the centroid thereof from each other. By adopting such an arrangement, it is possible to dispose the bonding surface 413a of the first stationary electrode 41 with the base 2 and the bonding surface 423a of the second stationary electrode 42 with the base 2 close to the respective bonding surfaces 511. Therefore, it is possible to more effectively reduce the difference in displacement in the Z-axis direction between the movable member 52 and the stationary electrode 4 when the warpage or the deflection occurs in the base 2 due to the heat, the residual stress, or the like.

It should be noted that a part of the movable member support 51 located between the two bonding surfaces 511 is not required to form one part, but can also be divided. Further, it is also possible to connect the first X-axis extending return arm 523 and the second X-axis extending return arm to each other in a gap formed by the division.

According also to such a fifth embodiment as described above, substantially the same advantages as in the first embodiment described above can be obtained.

Sixth Embodiment

Next, a physical quantity sensor according to a sixth embodiment of the invention will be described.

Figure 8:
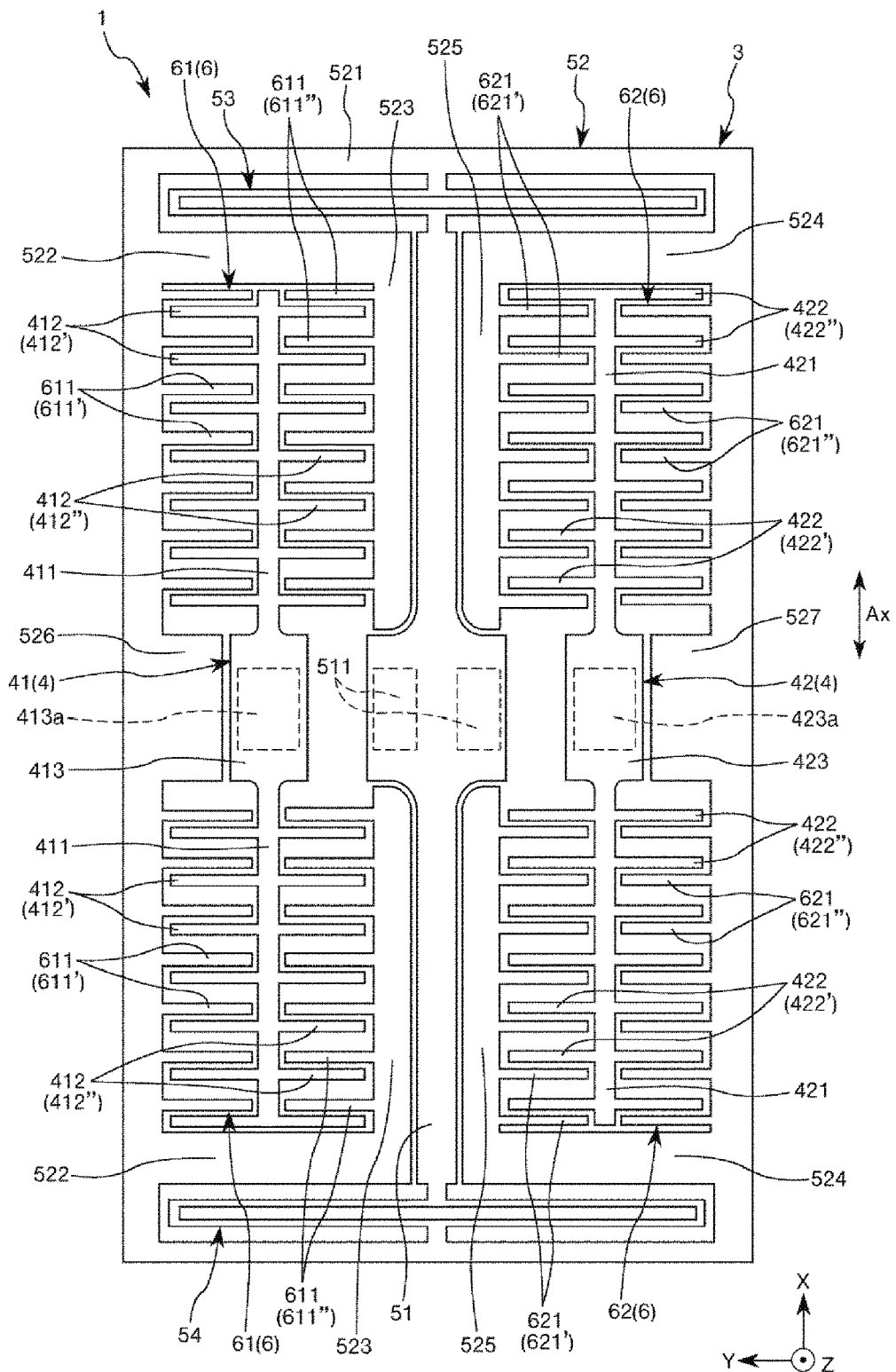
FIG. 8 is a plan view showing a physical quantity sensor according to a sixth embodiment of the invention.

FIG. 8 is a plan view showing the physical quantity sensor according to the sixth embodiment of the invention. It should be noted that in FIG. 8, the base and the lid are omitted from the drawing, and the sensor element alone is shown for the sake of convenience of explanation.

The physical quantity sensor 1 according to the present embodiment is substantially the same as the physical quantity sensor 1 according to the second embodiment described above except mainly the fact that the configuration of the sensor element 3 is different.

It should be noted that in the following description, the physical quantity sensor 1 according to the sixth embodiment will be described with a focus on the difference from the second embodiment described above, and the description of substantially the same issues will be omitted. Further, in FIG. 8, the constituents substantially the same as those of the first embodiment described above are denoted by the same reference symbols.

As shown in FIG. 8, the first stationary electrode 41 has a pair of first trunks 411 each extending along the X-axis direction. Further, the pair of first trunks 411 are located on respective sides opposite to each other in the X-axis direction with respect to the first trunk support 413. Specifically, one of the first trunks 411 extends from the first trunk support 413 toward the positive side in the X-axis direction, and the other of the first trunks 411 extends from the first trunk support 413 toward the negative side in the X-axis direction. Further, the plurality of stationary electrode fingers 412 is provided to each of the first trunks 411, and the movable member 52 is provided with the plurality of first movable electrode fingers 611 respectively opposed to the first stationary electrode fingers 412.

Similarly, the second stationary electrode 42 has a pair of second trunks 421 each extending along the X-axis direction. Further, the pair of second trunks 421 are located on respective sides opposite to each other in the X-axis direction with respect to the second trunk support 423. Specifically, one of the second trunks 421 extends from the second trunk support 423 toward the positive side in the X-axis direction, and the other of the second trunks 421 extends from the second trunk support 423 toward the negative side in the X-axis direction. Further, the plurality of second stationary electrode fingers 422 is provided to each of the second trunks 421, and the movable member 52 is provided with the plurality of second movable electrode fingers 621 respectively opposed to the second stationary electrode fingers 422.

According to such a configuration as described above, the number of the first and second stationary electrode fingers 412, 422 and the first and second movable electrode fingers 611, 621 can be increased compared to, for example, the second embodiment described above. Therefore, for example, if the lengths of the electrode fingers are equal to those in the first embodiment described above, it is possible to increase the capacitance between the first movable electrode fingers 611 and the first stationary electrode fingers 412 and the capacitance between the second movable electrode fingers 621 and the second stationary electrode fingers 422. Further, since the variation in capacitance when the acceleration Ax is applied also increases accordingly, the sensitivity is improved, and the acceleration Ax can be detected with higher accuracy. In another respect, for example, if the value of the capacitance is the same as in the first embodiment described above, the electrode fingers 412, 422, 611, 621 can be shortened accordingly, and thus, the electrode fingers 412, 422, 611, 621 become harder to be damaged.

Further, the bonding surfaces 511 of the movable member support 51 with the base 2 are located in the central part in the X-axis direction of the movable member support 51. Further, the bonding surfaces 511 are disposed at two places (the two places arranged in the Y-axis direction) in the central part of the movable member support 51 across the centroid thereof from each other. By adopting such an arrangement, it is possible to dispose the bonding surface 413a of the first stationary electrode 41 with the base 2 and the bonding surface 423a of the second stationary electrode 42 with the base 2 close to the respective bonding surfaces 511. Therefore, it is possible to more effectively reduce the difference in displacement in the Z-axis direction between the movable member 52 and the stationary electrode 4 when the warpage or the deflection occurs in the base 2 due to the heat, the residual stress, or the like.

According also to such a sixth embodiment as described above, substantially the same advantages as in the first embodiment described above can be obtained.

Seventh Embodiment

Next, a physical quantity sensor according to a seventh embodiment of the invention will be described.

Figure 9:
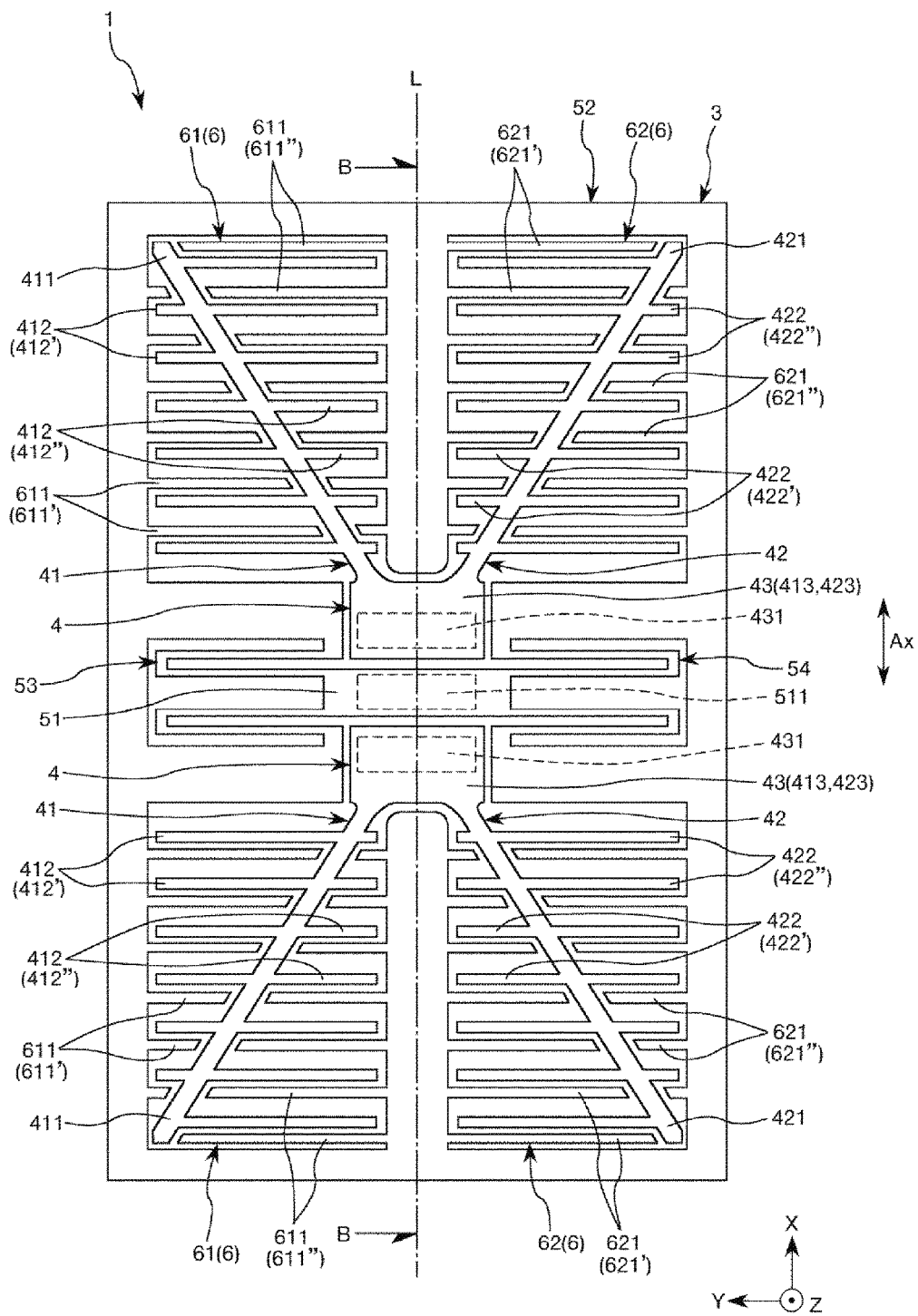
FIG. 9 is a plan view showing a physical quantity sensor according to a seventh embodiment of the invention.
Figure 10:
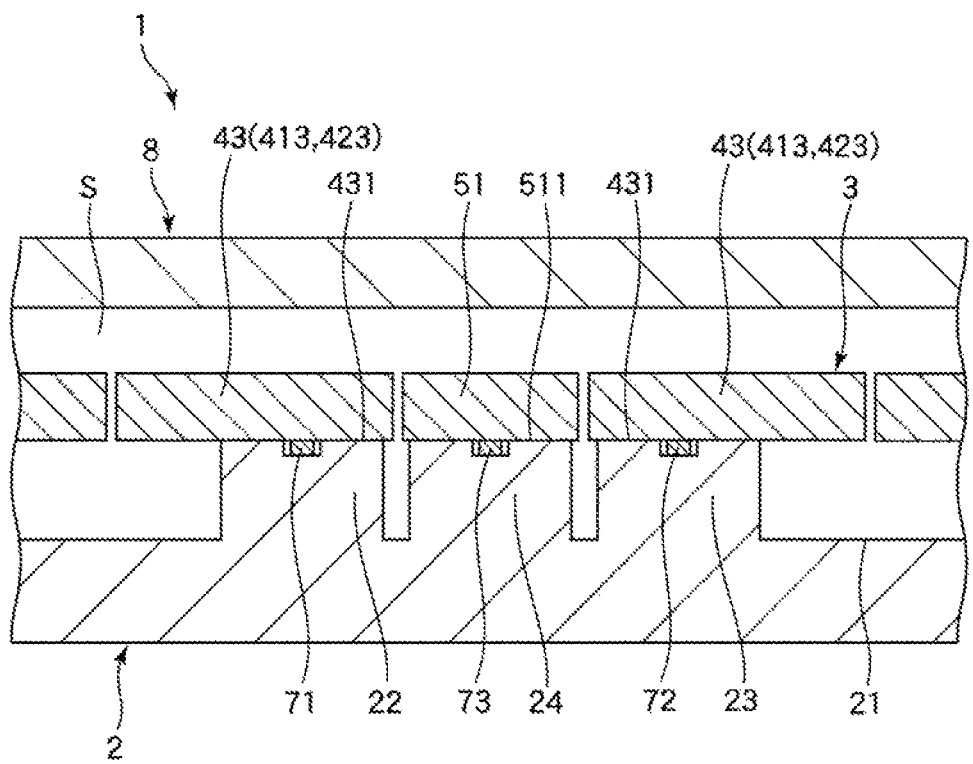
FIG. 10 is a cross-sectional view along the line B-B in FIG. 9.

FIG. 9 is a plan view showing the physical quantity sensor according to the seventh embodiment of the invention. FIG. 10 is a cross-sectional view along the line B-B in FIG. 9. It should be noted that in FIG. 9, the base and the lid are omitted from the drawing, and the sensor element alone is shown for the sake of convenience of explanation.

The physical quantity sensor 1 according to the present embodiment is substantially the same as the physical quantity sensor 1 according to the first embodiment described above except mainly the fact that the configuration of the sensor element 3 is different.

It should be noted that in the following description, the physical quantity sensor 1 according to the seventh embodiment will be described with a focus on the difference from the first embodiment described above, and the description of substantially the same issues will be omitted. Further, in each of FIG. 9 and FIG. 10, the constituents substantially the same as those of the first embodiment described above are denoted by the same reference symbols.

As shown in FIG. 9, a pair of stationary electrodes 4 are disposed side by side in the X-axis direction. Further, the pair of stationary electrodes 4 are line-symmetric about a line parallel to the Y axis. Further, each of the stationary electrodes 4 is provided with a trunk support 43 having the first trunk support 413 and the second trunk support 423 integrated with each other. Further, each of the trunk supports 43 is located on the central axis L in the plan view viewed from the Z-axis direction. According to such a configuration as described above, since the first trunk support 413 and the second trunk support 423 are integrated with each other, it is possible to achieve miniaturization of the physical quantity sensor 1.

Further, in the stationary electrode 4 located on the positive side in the X-axis direction, the first and second trunks 411, 421 are located on the positive side in the X-axis direction with respect to the trunk support 43, and in the stationary electrode 4 located on the negative side in the X-axis direction, the first and second trunks 411, 421 are located on the negative side in the X-axis direction with respect to the trunk support 43. Therefore, it is possible to dispose the pair of trunk supports 43 close to each other.

It should be noted that as shown in FIG. 10, one of the trunk supports 43 has a bonding surface 431 with the mount 22, and is electrically connected to the interconnection 71. Further, the other of the trunk supports 43 has a bonding surface 431 with the mount 23, and is electrically connected to the interconnection 72.

Here, in the stationary electrode 4 located on the positive side in the X-axis direction, each of the first movable electrode fingers 611 and each of the second movable electrode fingers 621 are located on the positive side in the X-axis direction with respect to corresponding one of the first stationary electrode fingers 412 and corresponding one of the second stationary electrode fingers 422. In contrast, in the stationary electrode 4 located on the negative side in the X-axis direction, each of the first movable electrode fingers 611 and each of the second movable electrode fingers 621 are located on the negative side in the X-axis direction with respect to corresponding one of the first stationary electrode fingers 412 and corresponding one of the second stationary electrode fingers 422. Thus, by performing the differential calculation on a first detection signal obtained between the one of the stationary electrodes 4 and the movable electrode 6, and a second detection signal obtained between the other of the stationary electrodes 4 and the movable electrode 6, it is possible to cancel the noise, and thus, the acceleration Ax can be detected with higher accuracy.

Further, the movable member support 51 is located between the two trunk supports 43, and extends in the Y-axis direction. Further, in the movable member support 51, the spring 53 is connected to an end on the positive side in the Y-axis direction, and the spring 54 is connected to an end on the negative side in the Y-axis direction. By adopting such an arrangement, it is possible to dispose the bonding surface 511 close to the two trunk supports 43. It should be noted that the configuration and the arrangement of the movable member support 51 are not particularly limited.

According also to such a seventh embodiment as described above, substantially the same advantages as in the first embodiment described above can be obtained.

Eighth Embodiment

Next, a physical quantity sensor according to an eighth embodiment of the invention will be described.

Figure 11:
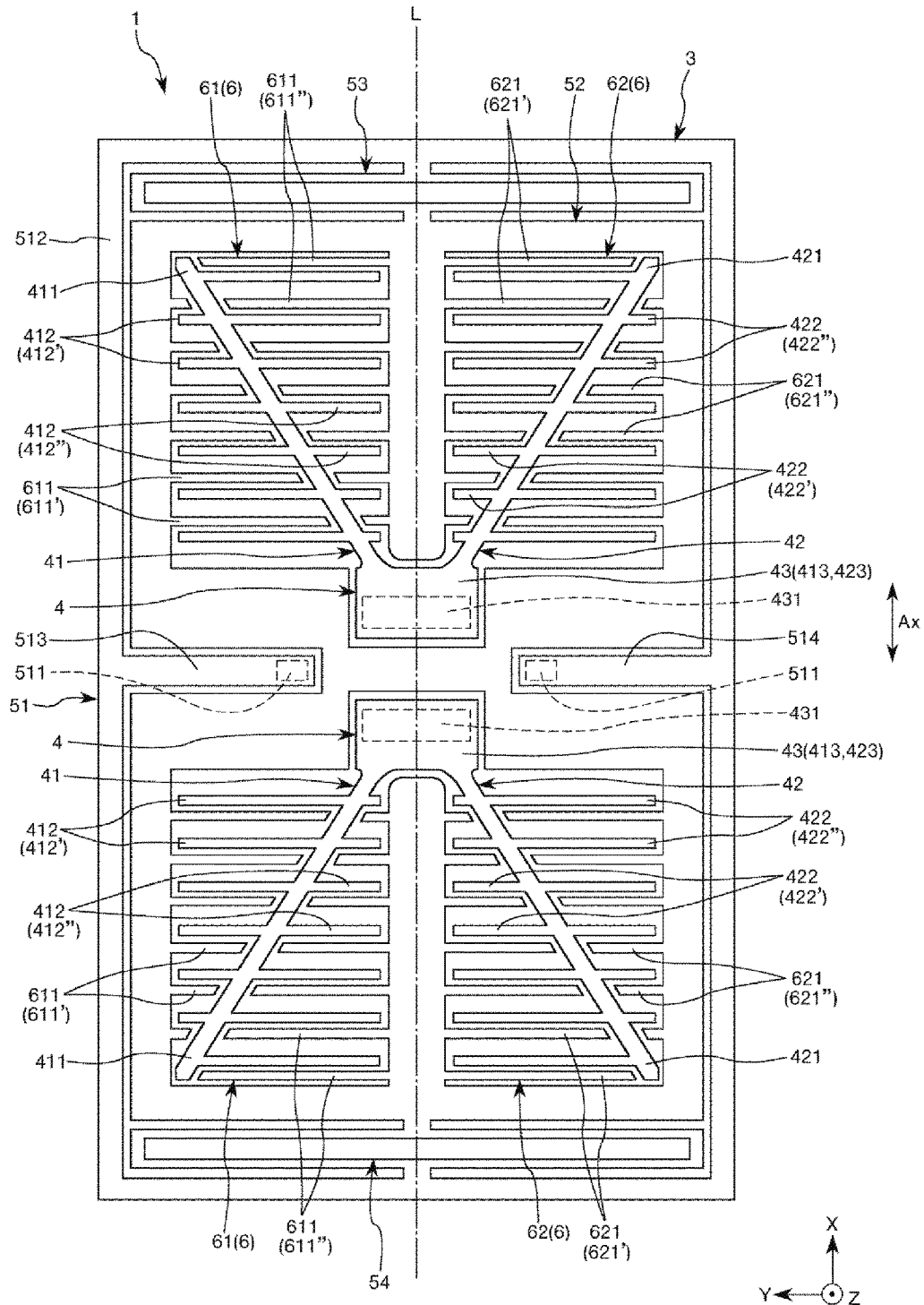
FIG. 11 is a plan view showing a physical quantity sensor according to an eighth embodiment of the invention.

FIG. 11 is a plan view showing the physical quantity sensor according to the eighth embodiment of the invention. It should be noted that in FIG. 11, the base and the lid are omitted from the drawing, and the sensor element alone is shown for the sake of convenience of explanation.

The physical quantity sensor 1 according to the present embodiment is substantially the same as the physical quantity sensor 1 according to the seventh embodiment described above except mainly the fact that the configuration of the sensor element 3 is different.

It should be noted that in the following description, the physical quantity sensor 1 according to the eighth embodiment will be described with a focus on the difference from the seventh embodiment described above, and the description of substantially the same issues will be omitted. Further, in FIG. 11, the constituents substantially the same as those of the seventh embodiment described above are denoted by the same reference symbols.

As shown in FIG. 11, the movable member support 51 is disposed outside the movable member 52. Further, the movable member support 51 has a frame shape, and is disposed so as to surround the movable member 52. Further, the movable member support 51 has a base 512 having a frame shape, and a pair of tabs 513, 514 projecting inward from the base 512. Further, the tabs 513, 514 are disposed symmetrically about the central axis L, and each project toward the center of the sensor element 3. Further, the bonding surfaces 511 with the mount 24 are disposed on the tips (ends on the central side) of the tabs 513, 514, respectively.

As described above, since the bonding surfaces 511 are disposed so as to be shifted toward the central part of the sensor element 3, it is possible to dispose each of the bonding surfaces 511 close to the bonding surface 413a of the first trunk support 413 and the bonding surface 423a of the second trunk support 423. Therefore, it is possible to more effectively reduce the difference in displacement in the Z-axis direction between the movable member 52 and the stationary electrode 4 when the warpage or the deflection occurs in the base 2 due to the heat, the residual stress, or the like. Therefore, the physical quantity can be detected with higher accuracy. In particular in the present embodiment, since the line segment connecting the pair of bonding surfaces 511 and the line segment connecting the bonding surfaces 413a, 423a cross each other, it is possible to dispose the bonding surfaces 511, 413a, 423a closer to each other, and thus the advantages described above become more pronounced.

Further, the springs 53, 54 are each located between the movable member 52 and the movable member support 51. Further, the spring 53 connects an end on the positive side in the X-axis direction of the movable member 52 and an end on the positive side in the X-axis direction of the movable member support 51 to each other, and the spring 54 connects an end on the negative side in the X-axis direction of the movable member 52 and an end on the negative side in the X-axis direction of the movable member support 51 to each other. Thus, it is possible to support the movable member 52 on both sides in the X-axis direction, and therefore, the posture and the behavior of the movable member 52 are stabilized. Therefore, it is possible to reduce unwanted vibrations to thereby detect the acceleration Ax with higher accuracy.

According also to such an eighth embodiment as described above, substantially the same advantages as in the first embodiment described above can be obtained.

Ninth Embodiment

Next, a physical quantity sensor according to a ninth embodiment of the invention will be described.

Figure 12:
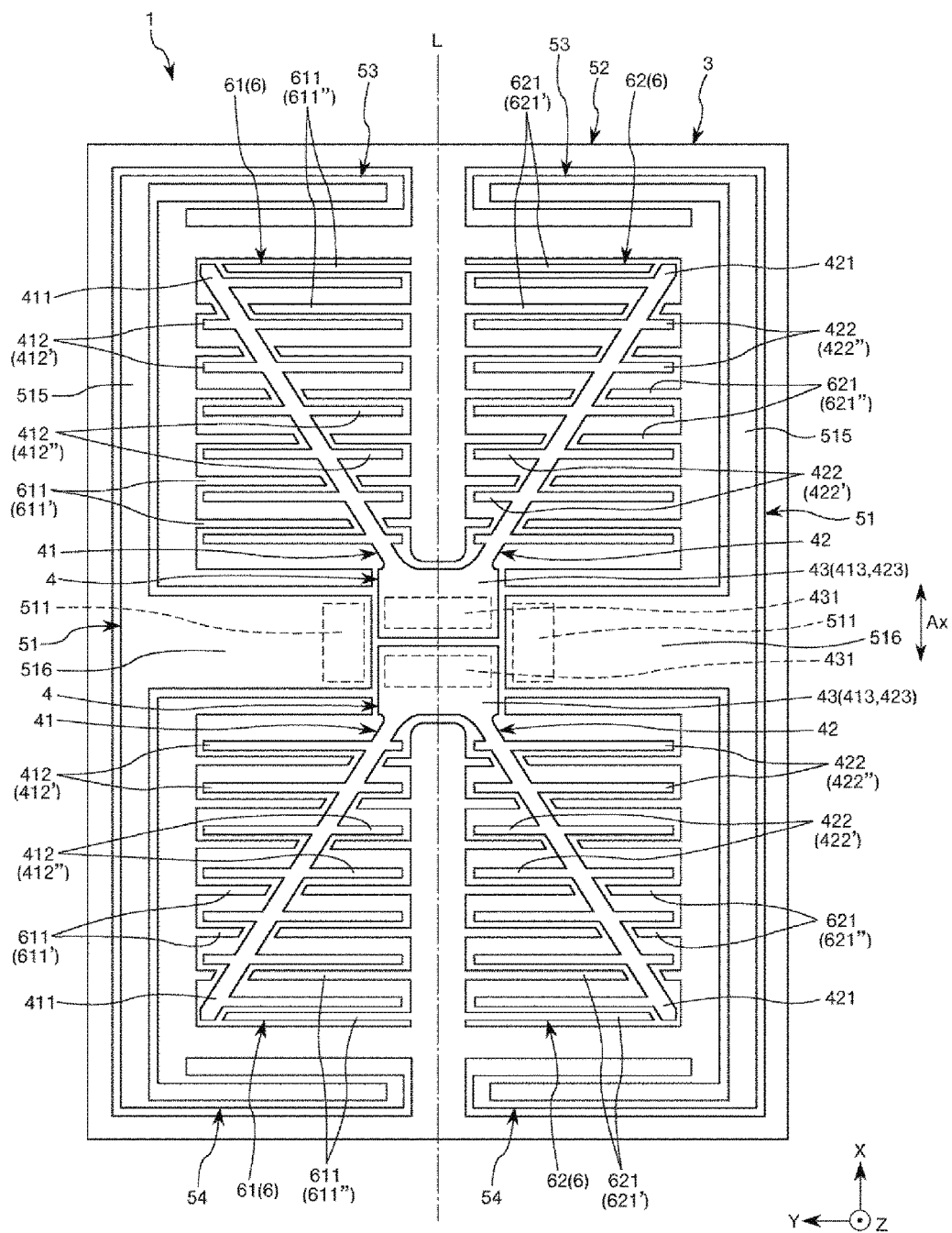
FIG. 12 is a plan view showing a physical quantity sensor according to a ninth embodiment of the invention.

FIG. 12 is a plan view showing the physical quantity sensor according to the ninth embodiment of the invention. It should be noted that in FIG. 12, the base and the lid are omitted from the drawing, and the sensor element alone is shown for the sake of convenience of explanation.

The physical quantity sensor 1 according to the present embodiment is substantially the same as the physical quantity sensor 1 according to the seventh embodiment described above except mainly the fact that the configuration of the sensor element 3 is different.

It should be noted that in the following description, the physical quantity sensor 1 according to the ninth embodiment will be described with a focus on the difference from the seventh embodiment described above, and the description of substantially the same issues will be omitted. Further, in FIG. 12, the constituents substantially the same as those of the seventh embodiment described above are denoted by the same reference symbols.

As shown in FIG. 12, the pair of movable member supports 51 are disposed inside the movable member 52. Further, one of the movable member supports 51 is located on the positive side in the Y-axis direction of the central axis L, and the other of the movable member supports 51 is located on the negative side in the Y-axis direction of the central axis L. Further, the pair of movable member supports 51 are disposed symmetrically about the central axis L.

Such movable member supports 51 each have a base 515 extending in the X-axis direction, and a tab 516 extending from a central part of the base 515 toward the center of the sensor element 3, and each form a T-shape. Further, the bonding surfaces 511 with the mount 24 are disposed on the tips (ends on the central side) of the tabs 516, respectively.

As described above, since the bonding surfaces 511 are disposed so as to be shifted toward the central part of the sensor element 3, it is possible to dispose each of the bonding surfaces 511 close to the bonding surface 413a of the first trunk support 413 and the bonding surface 423a of the second trunk support 423. Therefore, it is possible to more effectively reduce the difference in displacement in the Z-axis direction between the movable member 52 and the stationary electrode 4 when the warpage or the deflection occurs in the base 2 due to the heat, the residual stress, or the like. Therefore, the physical quantity can be detected with higher accuracy. In particular in the present embodiment, since the line segment connecting the pair of bonding surfaces 511 and the line segment connecting the bonding surfaces 413a, 423a cross each other, it is possible to dispose the bonding surfaces 511, 413a, 423a closer to each other, and thus the advantages described above become more pronounced.

Further, a pair of springs 53 are provided. Further, one of the springs 53 connects an end on the positive side in the X-axis direction of the movable member 52 and an end (an end on the positive side in the X-axis direction of the base 515) on the positive side in the X-axis direction of one of the movable member supports 51 to each other, and the other of the springs 53 connects an end on the positive side in the X-axis direction of the movable member 52 and an end (an end on the positive side in the X-axis direction of the base 515) on the positive side in the X-axis direction of the other of the movable member supports 51 to each other.

Similarly, a pair of springs 54 are provided. Further, one of the springs 54 connects an end on the negative side in the X-axis direction of the movable member 52 and an end (an end on the negative side in the X-axis direction of the base 515) on the negative side in the X-axis direction of one of the movable member supports 51 to each other, and the other of the springs 54 connects an end on the negative side in the X-axis direction of the movable member 52 and an end (an end on the negative side in the X-axis direction of the base 515) on the negative side in the X-axis direction of the other of the movable member supports 51 to each other.

Thus, it is possible to support the movable member 52 with the springs 53, 54 on both sides in the X-axis direction, and therefore, the posture and the behavior of the movable member 52 are stabilized. Therefore, it is possible to reduce unwanted vibrations to thereby detect the acceleration Ax with higher accuracy.

According also to such a ninth embodiment as described above, substantially the same advantages as in the first embodiment described above can be obtained. In particular in the present embodiment, since the movable member 52 has the frame shape, and is located on the outermost side, the mass of the movable member 52 can be made larger compared to, for example, the eighth embodiment described above. Therefore, the sensitivity is improved, and the physical quantity sensor 1 high in sensitivity is obtained.

Tenth Embodiment

Next, a physical quantity sensor according to a tenth embodiment of the invention will be described.

Figure 13:
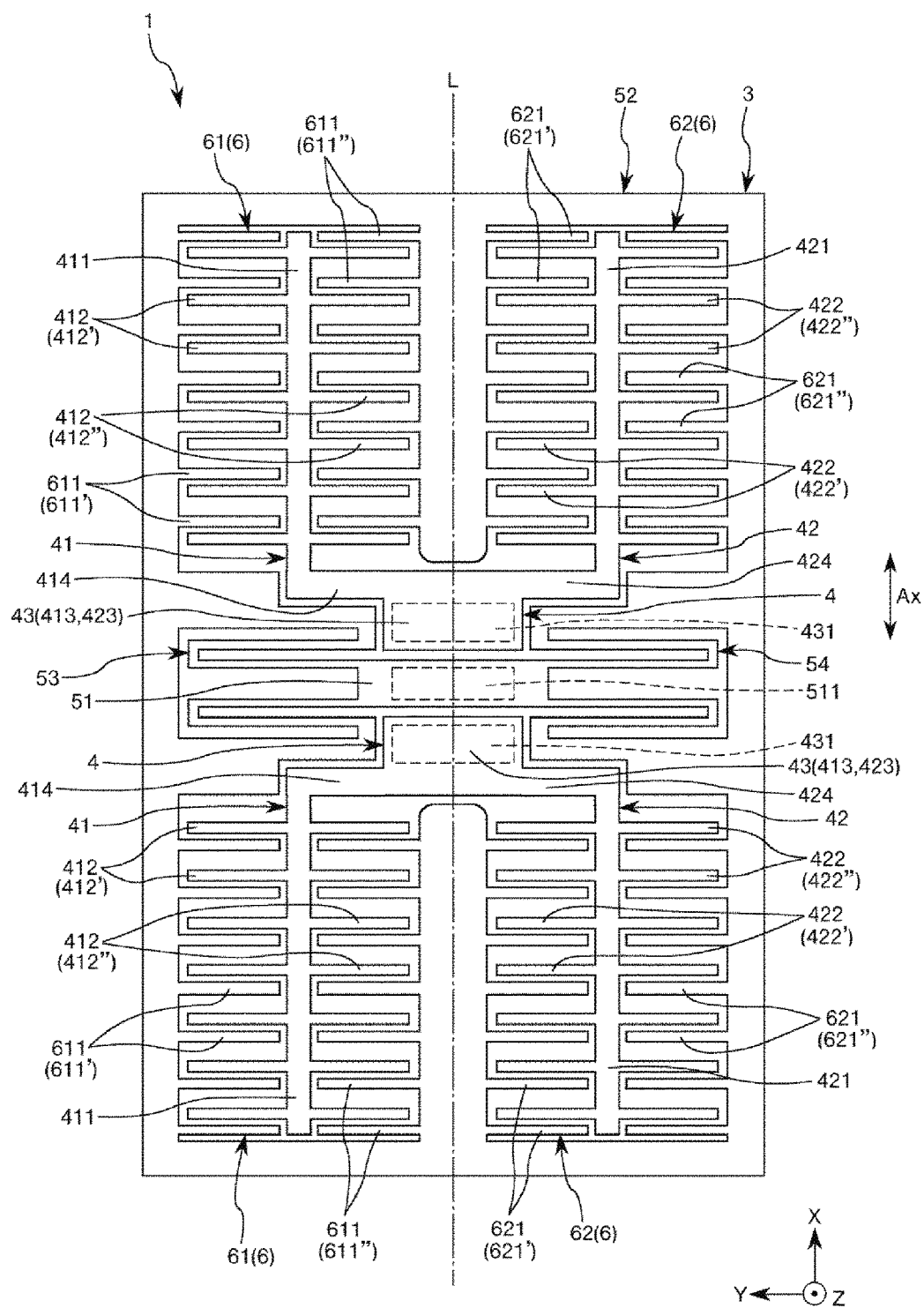
FIG. 13 is a plan view showing a physical quantity sensor according to a tenth embodiment of the invention.

FIG. 13 is a plan view showing the physical quantity sensor according to the tenth embodiment of the invention. It should be noted that in FIG. 13, the base and the lid are omitted from the drawing, and the sensor element alone is shown for the sake of convenience of explanation.

The physical quantity sensor 1 according to the present embodiment is substantially the same as the physical quantity sensor 1 according to the first embodiment described above except mainly the fact that the configuration of the sensor element 3 is different.

It should be noted that in the following description, the physical quantity sensor 1 according to the tenth embodiment will be described with a focus on the difference from the first embodiment described above, and the description of substantially the same issues will be omitted. Further, in FIG. 13, the constituents substantially the same as those of the first embodiment described above are denoted by the same reference symbols.

As shown in FIG. 13, a pair of stationary electrodes 4 are disposed side by side in the X-axis direction. Further, the pair of stationary electrodes 4 are line-symmetric about a line parallel to the Y axis. Further, each of the stationary electrodes 4 is provided with a trunk support 43 having the first trunk support 413 and the second trunk support 423 integrated with each other. Further, each of the trunk supports 43 is located on the central axis L in the plan view viewed from the Z-axis direction. According to such a configuration as described above, since the first trunk support 413 and the second trunk support 423 are integrated with each other, it is possible to achieve miniaturization of the physical quantity sensor 1.

It should be noted that similarly to the seventh embodiment described above, one of the trunk supports 43 has a bonding surface 431 with the mount 22, and is electrically connected to the interconnection 71. Further, the other of the trunk supports 43 has a bonding surface 431 with the mount 23, and is electrically connected to the interconnection 72.

Further, each of the first stationary electrodes 41 includes a first connector 414 for connecting the trunk support 43 and the first trunk 411 to each other. Further, the first trunk 411 extends along the X-axis direction. Further, the first connector 414 extends in the Y-axis direction, and is connected to an end of the first trunk 411.

Further, each of the second stationary electrodes 42 includes a second connector 424 for connecting the trunk support 43 and the second trunk 421 to each other. Further, the second trunk 421 extends along the X-axis direction. Further, the second connector 424 extends in the Y-axis direction, and is connected to an end of the second trunk 421.

Further, in the stationary electrode 4 located on the positive side in the X-axis direction, the first and second trunks 411, 421 are located on the positive side in the X-axis direction with respect to the trunk support 43, and in the stationary electrode 4 located on the negative side in the X-axis direction, the first and second trunks 411, 421 are located on the negative side in the X-axis direction with respect to the trunk support 43. Therefore, it is possible to dispose the pair of trunk supports 43 close to each other.

Here, in the stationary electrode 4 located on the positive side in the X-axis direction, each of the first movable electrode fingers 611 and each of the second movable electrode fingers 621 are located on the positive side in the X-axis direction with respect to corresponding one of the first stationary electrode fingers 412 and corresponding one of the second stationary electrode fingers 422. In contrast, in the stationary electrode 4 located on the negative side in the X-axis direction, each of the first movable electrode fingers 611 and each of the second movable electrode fingers 621 are located on the negative side in the X-axis direction with respect to corresponding one of the first stationary electrode fingers 412 and corresponding one of the second stationary electrode fingers 422. Thus, by performing the differential calculation on a first detection signal obtained between the one of the stationary electrodes 4 and the movable electrode 6, and a second detection signal obtained between the other of the stationary electrodes 4 and the movable electrode 6, it is possible to cancel the noise, and thus, the acceleration Ax can be detected with higher accuracy.

Further, the movable member support 51 is located between the two trunk supports 43, and extends in the Y-axis direction. Further, in the movable member support 51, the spring 53 is connected to an end on the positive side in the Y-axis direction, and the spring 54 is connected to an end on the negative side in the Y-axis direction. By adopting such an arrangement, it is possible to dispose the bonding surface 511 close to the two trunk supports 43. It should be noted that the configuration and the arrangement of the movable member support 51 are not particularly limited.

According also to such a tenth embodiment as described above, substantially the same advantages as in the first embodiment described above can be obtained.

Eleventh Embodiment

Next, a physical quantity sensor according to an eleventh embodiment of the invention will be described.

Figure 14:
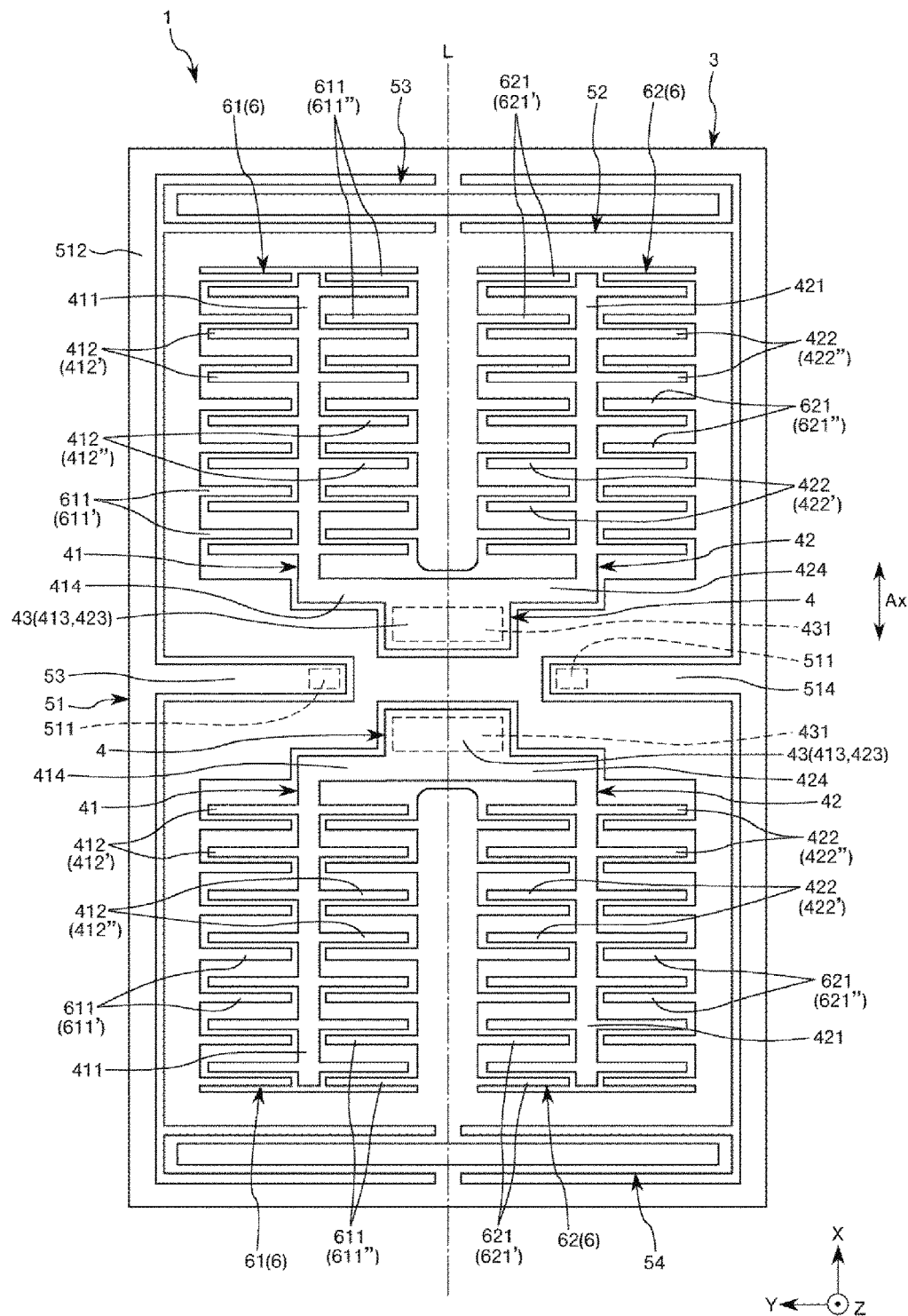
FIG. 14 is a plan view showing a physical quantity sensor according to an eleventh embodiment of the invention.

FIG. 14 is a plan view showing the physical quantity sensor according to the eleventh embodiment of the invention. It should be noted that in FIG. 14, the base and the lid are omitted from the drawing, and the sensor element alone is shown for the sake of convenience of explanation.

The physical quantity sensor 1 according to the present embodiment is substantially the same as the physical quantity sensor 1 according to the tenth embodiment described above except mainly the fact that the configuration of the sensor element 3 is different.

It should be noted that in the following description, the physical quantity sensor 1 according to the eleventh embodiment will be described with a focus on the difference from the tenth embodiment described above, and the description of substantially the same issues will be omitted. Further, in FIG. 14, the constituents substantially the same as those of the tenth embodiment described above are denoted by the same reference symbols.

As shown in FIG. 14, the movable member support 51 is disposed outside the movable member 52. Further, the movable member support 51 has a frame shape, and is disposed so as to surround the movable member 52. Further, the movable member support 51 has a base 512 having a frame shape, and a pair of tabs 513, 514 projecting inward from the base 512. Further, the tabs 513, 514 are disposed symmetrically about the central axis L, and each project toward the center of the sensor element 3. Further, the bonding surfaces 511 with the mount 24 are disposed on the tips (ends on the central side) of the tabs 513, 514, respectively.

As described above, since the bonding surfaces 511 are disposed so as to be shifted toward the central part of the sensor element 3, it is possible to dispose each of the bonding surfaces 511 close to the bonding surface 413*a* of the first trunk support 413 and the bonding surface 423*a* of the second trunk support 423. Therefore, it is possible to more effectively reduce the difference in displacement in the Z-axis direction between the movable member 52 and the stationary electrode 4 when the warpage or the deflection occurs in the base 2 due to the heat, the residual stress, or the like. Therefore, the physical quantity can be detected with higher accuracy. In particular in the present embodiment, since the line segment connecting the pair of bonding surfaces 511 and the line segment connecting the bonding surfaces 413*a*, 423*a* cross each other, it is possible to dispose the bonding surfaces 511, 413*a*, 423*a* closer to each other, and thus the advantages described above become more pronounced.

Further, the springs 53, 54 are each located between the movable member 52 and the movable member support 51. Further, the spring 53 connects an end on the positive side in the X-axis direction of the movable member 52 and an end on the positive side in the X-axis direction of the movable member support 51 to each other, and the spring 54 connects an end on the negative side in the X-axis direction of the movable member 52 and an end on the negative side in the X-axis direction of the movable member support 51 to each other. Thus, it is possible to support the movable member 52 on both sides in the X-axis direction, and therefore, the posture and the behavior of the movable member 52 are stabilized. Therefore, it is possible to reduce unwanted vibrations to thereby detect the acceleration Ax with higher accuracy.

According also to such an eleventh embodiment as described above, substantially the same advantages as in the first embodiment described above can be obtained.

Twelfth Embodiment

Next, a physical quantity sensor according to a twelfth embodiment of the invention will be described.

Figure 15:
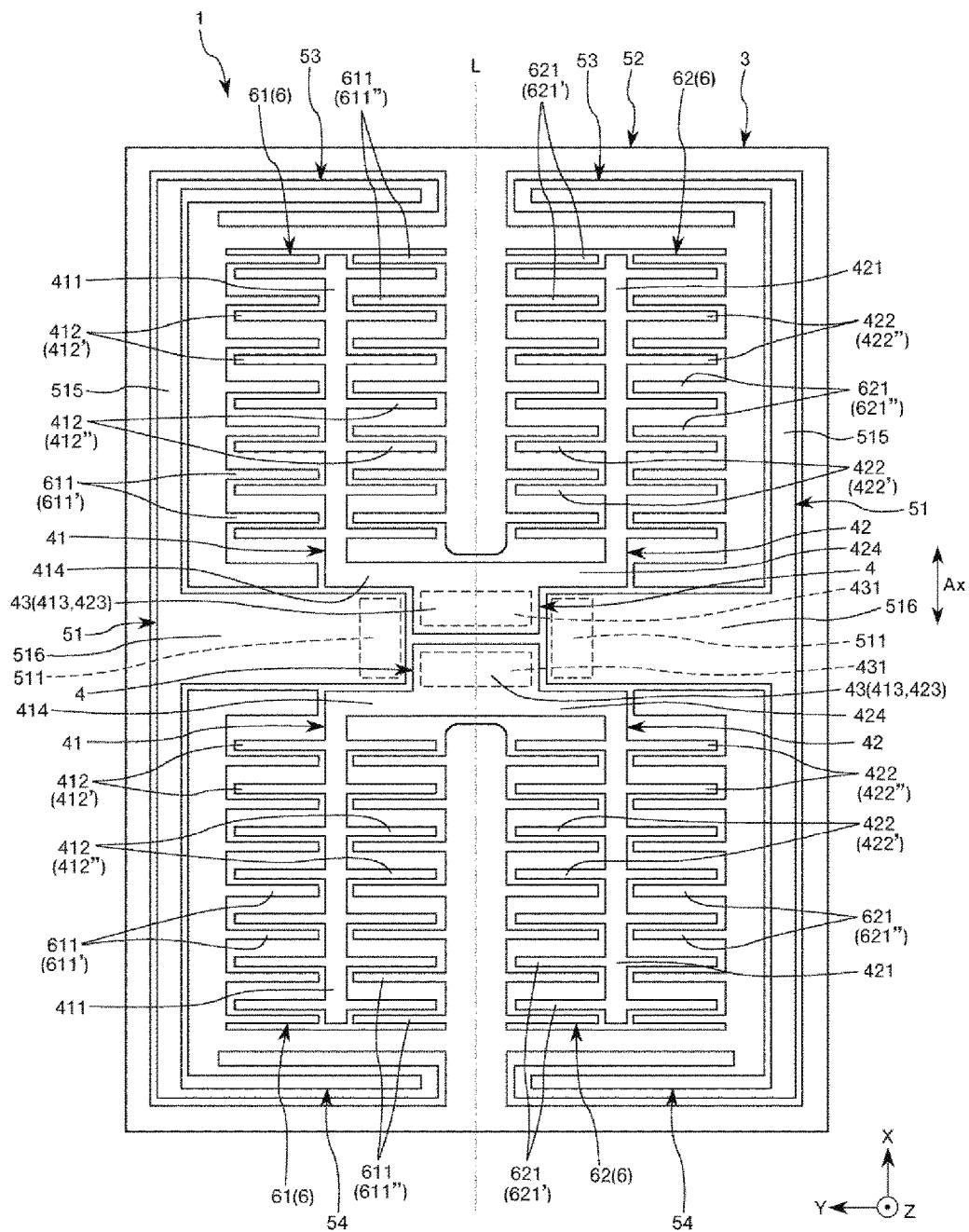
FIG. 15 is a plan view showing a physical quantity sensor according to a twelfth embodiment of the invention.

FIG. 15 is a plan view showing the physical quantity sensor according to the twelfth embodiment of the invention. It should be noted that in FIG. 15, the base and the lid are omitted from the drawing, and the sensor element alone is shown for the sake of convenience of explanation.

The physical quantity sensor 1 according to the present embodiment is substantially the same as the physical quantity sensor 1 according to the tenth embodiment described above except mainly the fact that the configuration of the sensor element 3 is different.

It should be noted that in the following description, the physical quantity sensor 1 according to the twelfth embodiment will be described with a focus on the difference from the tenth embodiment described above, and the description of substantially the same issues will be omitted. Further, in FIG. 15, the constituents substantially the same as those of the tenth embodiment described above are denoted by the same reference symbols.

As shown in FIG. 15, the pair of movable member supports 51 are disposed inside the movable member 52. Further, one of the movable member supports 51 is located on the positive side in the Y-axis direction of the central axis L, and the other of the movable member supports 51 is located on the negative side in the Y-axis direction of the central axis L. Further, the pair of movable member supports 51 are disposed symmetrically about the central axis L.

Such movable member supports 51 each have a base 515 extending in the X-axis direction, and a tab 516 extending from a central part of the base 515 toward the center of the sensor element 3, and each form a T-shape. Further, the bonding surfaces 511 with the mount 24 are disposed on the tips (ends on the central side) of the tabs 516, respectively.

As described above, since the bonding surfaces 511 are disposed so as to be shifted toward the central part of the sensor element 3, it is possible to dispose each of the bonding surfaces 511 close to the bonding surface 413*a* of the first trunk support 413 and the bonding surface 423*a* of the second trunk support 423. Therefore, it is possible to more effectively reduce the difference in displacement in the Z-axis direction between the movable member 52 and the stationary electrode 4 when the warpage or the deflection occurs in the base 2 due to the heat, the residual stress, or the like. Therefore, the physical quantity can be detected with higher accuracy. In particular in the present embodiment, since the line segment connecting the pair of bonding surfaces 511 and the line segment connecting the bonding surfaces 413a, 423a cross each other, it is possible to dispose the bonding surfaces 511, 413a, 423a closer to each other, and thus the advantages described above become more pronounced.

Further, a pair of springs 53 are provided. Further, one of the springs 53 connects an end on the positive side in the X-axis direction of the movable member 52 and an end (an end on the positive side in the X-axis direction of the base 515) on the positive side in the X-axis direction of one of the movable member supports 51 to each other, and the other of the springs 53 connects an end on the positive side in the X-axis direction of the movable member 52 and an end (an end on the positive side in the X-axis direction of the base 515) on the positive side in the X-axis direction of the other of the movable member supports 51 to each other.

Similarly, a pair of springs 54 are provided. Further, one of the springs 54 connects an end on the negative side in the X-axis direction of the movable member 52 and an end (an end on the negative side in the X-axis direction of the base 515) on the negative side in the X-axis direction of one of the movable member supports 51 to each other, and the other of the springs 54 connects an end on the negative side in the X-axis direction of the movable member 52 and an end (an end on the negative side in the X-axis direction of the base 515) on the negative side in the X-axis direction of the other of the movable member supports 51 to each other.

Thus, it is possible to support the movable member 52 with the springs 53, 54 on both sides in the X-axis direction, and therefore, the posture and the behavior of the movable member 52 are stabilized. Therefore, it is possible to reduce unwanted vibrations to thereby detect the acceleration Ax with higher accuracy.

According also to such a twelfth embodiment as described above, substantially the same advantages as in the first embodiment described above can be obtained. In particular in the present embodiment, since the movable member 52 has the frame shape, and is located on the outermost side, the mass of the movable member 52 can be made larger compared to, for example, the eleventh embodiment described above. Therefore, the sensitivity is improved, and the physical quantity sensor 1 high in sensitivity is obtained.

Thirteenth Embodiment

Next, a physical quantity sensor according to a thirteenth embodiment of the invention will be described.

Figure 16:
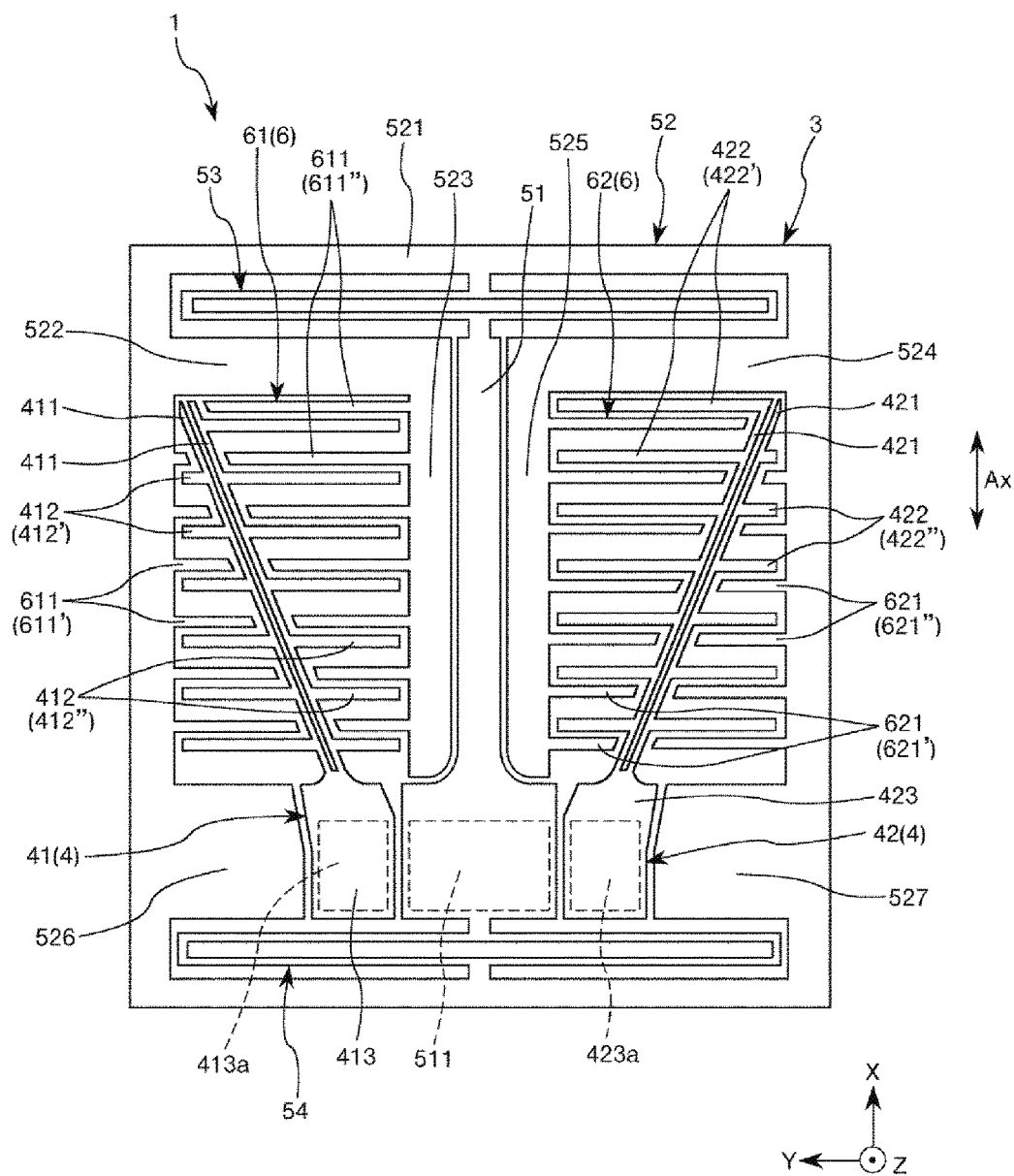
FIG. 16 is a plan view showing a physical quantity sensor according to a thirteenth embodiment of the invention.

FIG. 16 is a plan view showing the physical quantity sensor according to the thirteenth embodiment of the invention. It should be noted that in FIG. 16, the base and the lid are omitted from the drawing, and the sensor element alone is shown for the sake of convenience of explanation.

The physical quantity sensor 1 according to the present embodiment is substantially the same as the physical quantity sensor 1 according to the first embodiment described above except mainly the fact that the configuration of the sensor element 3 is different.

It should be noted that in the following description, the physical quantity sensor 1 according to the thirteenth embodiment will be described with a focus on the difference from the first embodiment described above, and the description of substantially the same issues will be omitted. Further, in FIG. 16, the constituents substantially the same as those of the first embodiment described above are denoted by the same reference symbols.

As shown in FIG. 16, the first stationary electrode 41 has a pair of first trunks 411 disposed side by side in the Y-axis direction. In other words, the first trunk 411 has a slit along the longitudinal direction of the first trunk 411, and is divided into two parts (branched into two parts). Further, the plurality of first stationary electrode fingers 412 (412') extends from the first trunk 411 located on the positive side in the Y-axis direction toward the positive side in the Y-axis direction, and the plurality of first stationary electrode fingers 412 (412") extends from the first trunk 411 located on the negative side in the Y-axis direction toward the negative side in the Y-axis direction.

Similarly, the second stationary electrode 42 has a pair of second trunks 421 disposed side by side in the Y-axis direction. In other words, the second trunk 421 has a slit along the longitudinal direction of the second trunk 421, and is divided into two parts (branched into two parts). Further, the plurality of second stationary electrode fingers 422 (422') extends from the second trunk 421 located on the positive side in the Y-axis direction toward the positive side in the Y-axis direction, and the plurality of second stationary electrode fingers 422 (422") extends from the second trunk 421 located on the negative side in the Y-axis direction toward the negative side in the Y-axis direction.

According also to such a thirteenth embodiment as described above, substantially the same advantages as in the first embodiment described above can be obtained. In particular, by providing the plurality of first trunks 411 and the plurality of second trunks 421, there is an advantage that the degree of the design freedom of the shapes (the pattern shapes) of the first and second stationary electrodes 41, 42 increases.

Fourteenth Embodiment

Next, a physical quantity sensor device according to a fourteenth embodiment of the invention will be described.

Figure 17:
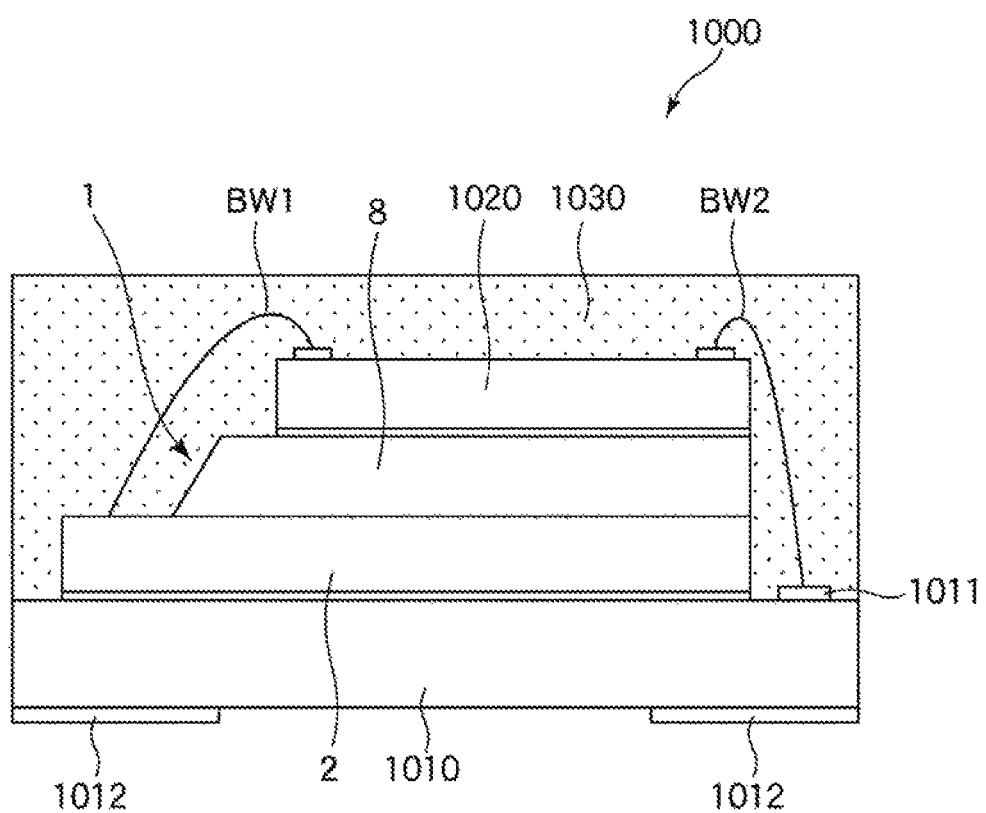
FIG. 17 is a cross-sectional view showing a physical quantity sensor device according to a fourteenth embodiment of the invention.

FIG. 17 is a cross-sectional view showing the physical quantity sensor device according to the fourteenth embodiment of the invention.

As shown in FIG. 17, the physical quantity sensor device 1000 has a base substrate 1010, the physical quantity sensor 1, a circuit element 1020 (IC), bonding wires BW1, bonding wires BW2, and a molded body 1030, wherein the physical quantity sensor 1 is disposed on the base substrate 1010, the circuit element 1020 (IC) is disposed on the physical quantity sensor 1, the bonding wires BW1 electrically connect the physical quantity sensor 1 and the circuit element 1020 to each other, the bonding wires electrically connect the base substrate 1010 and the circuit element 1020 to each other, and the molded body 1030 includes the physical quantity sensor 1 and the circuit element 1020 as a mold. Here, as the physical quantity sensor 1, any one of the physical quantity sensors according to the first through thirteenth embodiments described above can be used.

The base substrate 1010 is a substrate for supporting the physical quantity sensor 1, and is, for example, an interposer substrate. On the upper surface of such a base substrate 1010, there is disposed a plurality of connection terminals 1011, and a plurality of mounting terminals is disposed on the lower surface thereof. Further, in the base substrate 1010, there are interconnections (not shown), and the connection terminals 1011 are electrically connected to the corresponding mounting terminals via the interconnections. The material of such a base substrate 1010 is not particularly limited, but a silicon substrate, a resin substrate, a glass substrate, and a glass-epoxy substrate, for example, can be used.

Further, the physical quantity sensor 1 is disposed on the base substrate 1010 with the base 2 facing downward (toward the base substrate 1010 side). Further, the physical quantity sensor 1 is bonded to the base substrate 1010 via a bonding material.

Further, the circuit element 1020 is disposed on the physical quantity sensor 1. Also, the circuit element 1020 is bonded to the lid 8 of the physical quantity sensor 1 via a bonding material. Additionally, the circuit element 1020 is electrically connected to the interconnections 71, 72, 73 of the physical quantity sensor 1 via the bonding wires BW1, and is electrically connected to the connection terminals 1011 of the base substrate 1010 via the bonding wires BW2. Such circuit element 1020 includes a drive circuit for driving the physical quantity sensor 1, a detection circuit for detecting the acceleration based on the output signal from the physical quantity sensor 1, an output circuit for converting the signal from the detection circuit into a predetermined signal to output the result, and so on as needed.

Further, the molded body 1030 includes the physical quantity sensor 1 and the circuit element 1020 as a mold. Thus, it is possible to protect the physical quantity sensor 1 and the circuit element 1020 from moisture, dusts, impacts, and so on. The molded body 1030 is not particularly limited, but, for example, thermosetting epoxy resin can be used, and it is possible to form the mold using, for example, a transfer molding method.

The physical quantity sensor device 1000 described above includes the physical quantity sensor 1. Therefore, it is possible to appreciate the advantages of the physical quantity sensor 1, and it is possible to obtain the physical quantity sensor device 1000 high in reliability.

It should be noted that the configuration of the physical quantity sensor device 1000 is not limited to the configuration described above, but it is also possible to adopt a configuration in which, for example, the physical quantity sensor 1 is housed in a ceramic package.

Fifteenth Embodiment

Next, an electronic apparatus according to a fifteenth embodiment of the invention will be described.

Figure 18:
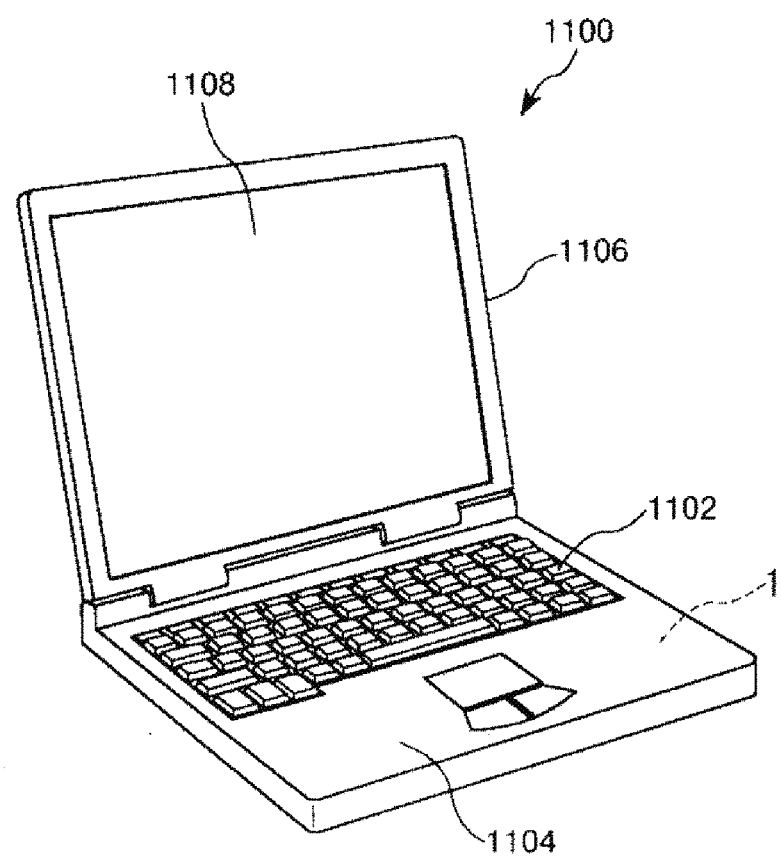
FIG. 18 is a perspective view showing an electronic apparatus according to a fifteenth embodiment of the invention.

FIG. 18 is a perspective view showing the electronic apparatus according to the fifteenth embodiment of the invention.

A mobile type (or a laptop type) personal computer 1100 shown in FIG. 18 is an application of the electronic apparatus equipped with the physical quantity sensor according to the invention. In the drawing, the personal computer 1100 includes a main body 1104 provided with a keyboard 1102, and a display lid 1106 provided with a display 1108, and the display lid 1106 is pivotally supported with respect to the main body 1104 via a hinge structure. Such a personal computer 1100 incorporates the physical quantity sensor 1 functioning as an acceleration sensor. Here, as the physical quantity sensor 1, any one of the physical quantity sensors according to the first through thirteenth embodiments described above can be used.

Such a personal computer 1100 (the electronic apparatus) has the physical quantity sensor 1. Therefore, it is possible to appreciate the advantages of the physical quantity sensor 1 described above, and the high reliability can be obtained.

Sixteenth Embodiment

Next, an electronic apparatus according to a sixteenth embodiment of the invention will be described.

Figure 19:
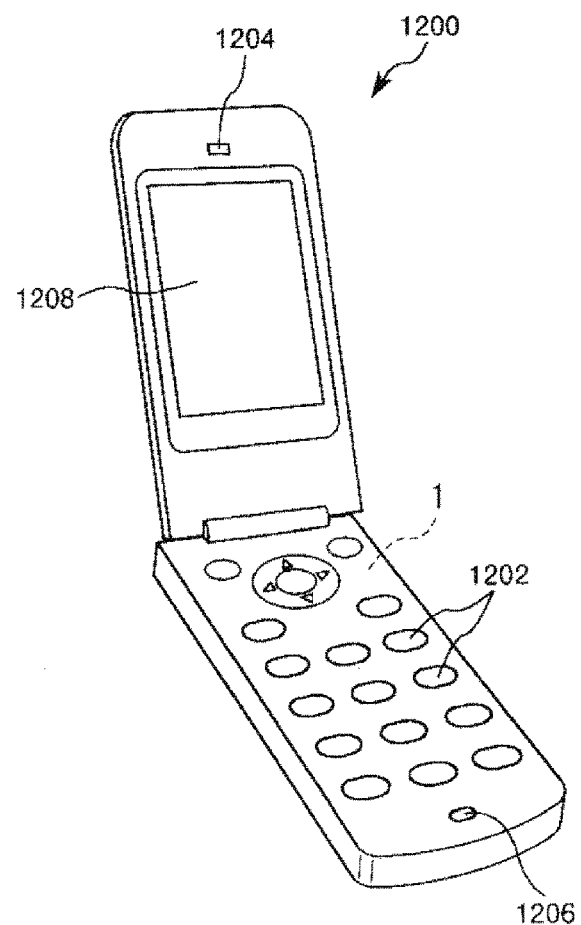
FIG. 19 is a perspective view showing an electronic apparatus according to a sixteenth embodiment of the invention.

FIG. 19 is a perspective view showing the electronic apparatus according to the sixteenth embodiment of the invention.

The cellular phone 1200 (including PHS) shown in FIG. 19 is an application of the electronic apparatus equipped with the physical quantity sensor according to the invention. In this drawing, the cellular phone 1200 is provided with an antenna (not shown), a plurality of operation buttons 1202, an ear piece 1204, and a mouthpiece 1206, and a display 1208 is disposed between the operation buttons 1202 and the earpiece 1204. Such a cellular phone 1200 incorporates the physical quantity sensor 1 functioning as an acceleration sensor. Here, as the physical quantity sensor 1, any one of the physical quantity sensors according to the first through thirteenth embodiments described above can be used.

Such a cellular phone 1200 (the electronic apparatus) has the physical quantity sensor 1. Therefore, it is possible to appreciate the advantages of the physical quantity sensor 1 described above, and the high reliability can be obtained.

Seventeenth Embodiment

Next, an electronic apparatus according to a seventeenth embodiment of the invention will be described.

Figure 20:
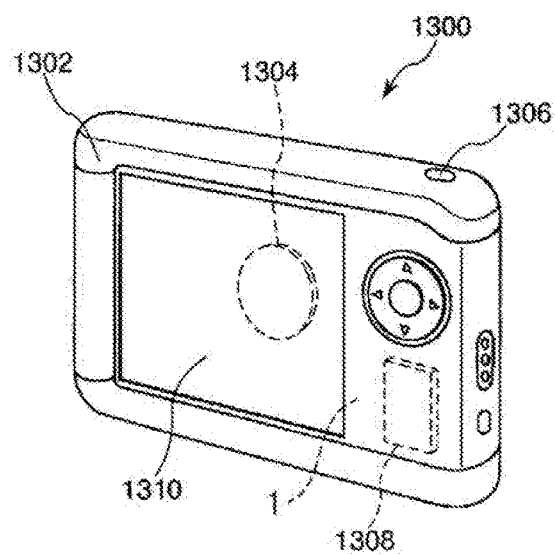
FIG. 20 is a perspective view showing an electronic apparatus according to a seventeenth embodiment of the invention.

FIG. 20 is a perspective view showing the electronic apparatus according to the seventeenth embodiment of the invention.

The digital still camera 1300 shown in FIG. 20 is an application of the electronic apparatus equipped with the physical quantity sensor according to the invention. In this drawing, the case (body) 1302 is provided with a display 1310 disposed on the back surface thereof to have a configuration of performing display in accordance with the imaging signal from the CCD, wherein the display 1310 functions as a viewfinder for displaying the object as an electronic image. Further, the front surface (the back side in the drawing) of the case 1302 is provided with a light receiver 1304 including an optical lens (an imaging optical system), the CCD, and so on. Then, when the photographer checks an object image displayed on the display 1310, and then presses a shutter button 1306, the imaging signal from the CCD at that moment is transferred to and stored in a memory 1308. Such a digital still camera 1300 incorporates the physical quantity sensor 1 functioning as an acceleration sensor. Here, as the physical quantity sensor 1, any one of the physical quantity sensors according to the first through thirteenth embodiments described above can be used.

Such a digital still camera 1300 (the electronic apparatus) includes the physical quantity sensor 1. Therefore, it is possible to appreciate the advantages of the physical quantity sensor 1 described above, and the high reliability can be obtained.

It should be noted that, as the electronic apparatus according to the invention, there can be cited, for example, a smartphone, a tablet terminal, a timepiece (including a smart watch), an inkjet ejection device (e.g., an inkjet printer), a laptop personal computer, a television set, a wearable terminal such as a head-mounted display (HMD), a video camera, a video cassette recorder, a car navigation system, a pager, a personal digital assistance (including one with a communication function), an electronic dictionary, an electric calculator, a computerized game machine, a word processor, a workstation, a video phone, a security video monitor, a pair of electronic binoculars, a POS terminal, a medical device (e.g., an electronic thermometer, an electronic manometer, an electronic blood sugar meter, an electrocardiogram measurement instrument, an ultrasonograph, and an electronic endoscope), a fish detector, a variety of types of measurement instruments, abase station apparatus for a mobile terminal, a variety of types of gauges (e.g., gauges for a vehicle, an aircraft, or a ship), a flight simulator, and a net-work server besides the personal computer and the cellular phone according to the embodiment described above, and the digital still camera according to the embodiment.

Eighteenth Embodiment

Next, a vehicle according to an eighteenth embodiment of the invention will be described.

Figure 21:
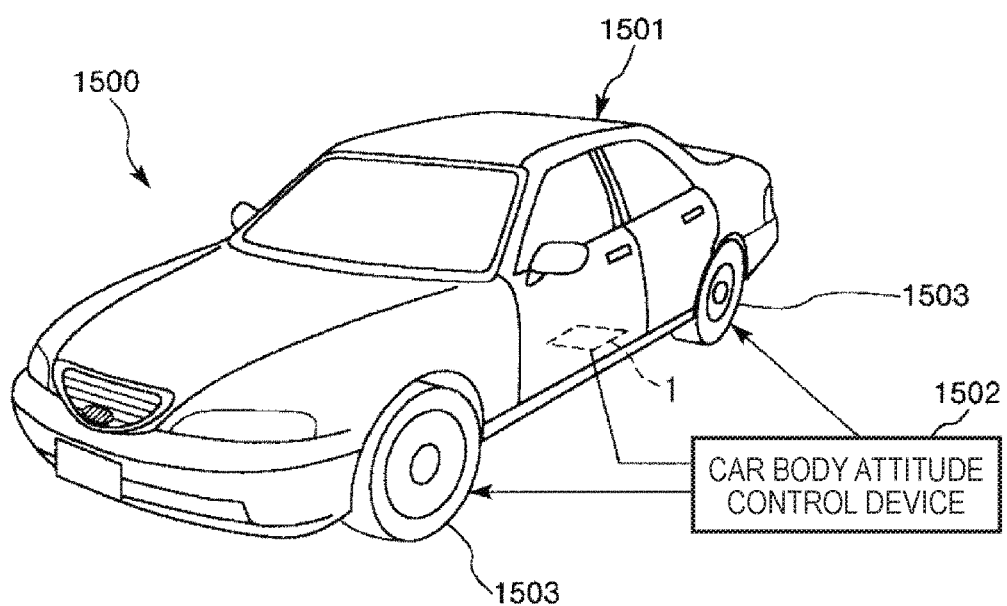
FIG. 21 is a perspective view showing a vehicle according to an eighteenth embodiment of the invention.

FIG. 21 is a perspective view showing the vehicle according to the eighteenth embodiment of the invention.

The car 1500 shown in FIG. 21 is an application of the vehicle equipped with the physical quantity sensor according to the invention. In this drawing, the car 1500 incorporates the physical quantity sensor 1 functioning as the acceleration sensor, and the attitude of a car body 1501 can be detected using the physical quantity sensor 1. The detection signal of the physical quantity sensor 1 is supplied to a car body attitude control device 1502, and it is possible for the car body attitude control device 1502 to detect the attitude of the car body 1501 based on the detection signal, and to control the stiffness of the suspension or control the braking of each of wheels 1503 in accordance with the detection result. Here, as the physical quantity sensor 1, any one of the physical quantity sensors according to the first through thirteenth embodiments described above can be used.

Such a car 1500 (the vehicle) has the physical quantity sensor 1. Therefore, it is possible to appreciate the advantages of the physical quantity sensor 1 described above, and the high reliability can be obtained.

It should be noted that besides the above, the physical quantity sensor 1 can widely be applied to an electronic control unit (ECU) such as a car navigation system, a car air-conditioner, an anti-lock braking system (ABS), an airbag system, a tire pressure monitoring system (TPMS), an engine controller, or a battery monitor for a hybrid car or an electric car.

Further, the vehicle is not limited to the car 1500, but can also be applied to, for example, an airplane, a rocket, an artificial satellite, a ship and a boat, an automated guided vehicle (AGV), a two-legged robot, and an unmanned drone such as a drone.

Although the physical quantity sensor, the physical quantity sensor device, the electronic apparatus, and the vehicle according to the invention are hereinabove described based on the respective embodiments shown in the accompanying drawings, the invention is not limited to the embodiments, but the configuration of each of the components can be replaced with one having an identical function and any configuration. Further, it is also possible to add any other constituents to the invention. Further, it is also possible to arbitrarily combine any of the embodiments described above with each other. Further, the X-axis direction (the first direction) and the Y-axis direction (the second direction) are perpendicular to each other in the embodiments described above, but are not limited to this configuration. It is sufficient for the X-axis direction and the Y-axis direction to cross each other.

Further, although in the embodiments described above, there is described the configuration having a single sensor element, it is possible to provide a plurality of sensor elements. In this case, by disposing the plurality of sensor elements so as to have respective detection axes different from each other, it is possible to detect the acceleration in a plurality of axial directions.

Further, although in the embodiments described above, the acceleration sensor for detecting the acceleration is described as the physical quantity sensor, the physical quantity detected by the physical quantity sensor is not limited to the acceleration.

The entire disclosure of Japanese Patent Application No. 2016-237919 filed Dec. 7, 2016 is expressly incorporated by reference herein.

What is claimed is:

1. A physical quantity sensor comprising:
a base; and
a sensor element adapted to detect a physical quantity, wherein the sensor element includes:
a stationary electrode attached to the base, and
a movable member, which is configured to be displaced in a first direction as a detection axis direction of the physical quantity, and is provided with a movable electrode,
the stationary electrode includes:
a first stationary electrode and a second stationary electrode arranged side by side along a second direction perpendicular to the first direction,
the first stationary electrode includes:
a first trunk, and
a plurality of first stationary electrode fingers disposed on both sides of the first trunk, the plurality of first stationary electrode fingers extending from the first trunk in the second direction,
the second stationary electrode includes:
a second trunk, and
a plurality of second stationary electrode fingers disposed on both sides of the second trunk, the plurality of second stationary electrode fingers extending from the second trunk in the second direction,
the movable electrode includes:
a first movable electrode and a second movable electrode arranged side by side along the second direction,
the first movable electrode includes:
a plurality of first movable electrode fingers disposed on both sides of the first trunk, the plurality of first movable electrode fingers extending in the second direction, the plurality of first movable electrode fingers facing the plurality of first stationary electrode fingers in the first direction, and
the second movable electrode includes:
a plurality of second movable electrode fingers positioned on both sides of the second trunk, the plurality of second movable electrode fingers extending in the second direction, the plurality of second movable electrode fingers facing the plurality of second stationary electrode fingers in the first direction,
wherein the first trunk extends in a third direction that is tilted with respect to the first and second directions, and the second trunk extends in a fourth direction that is tilted with respect to the first and second directions.

2. The physical quantity sensor according to claim 1, wherein
the first trunk and the second trunk are tilted toward respective sides opposite to each other with respect to the first direction.

3. The physical quantity sensor according to claim 2, wherein the first trunk is tilted with respect to the first direction at an angle no smaller than 10° and no larger than 45°, and the second trunk is tilted with respect to the first direction at an angle no smaller than 10° and no larger than 45°.

4. The physical quantity sensor according to claim 3, wherein the angle of the first trunk is no smaller than 10° and no larger than 30°, and the angle of the second trunk is no smaller than 10° and no larger than 30°.

5. The physical quantity sensor according to claim 2, wherein the plurality of first stationary electrode fingers is disposed along the first direction, longitudinal lengths of the plurality of first stationary electrode fingers disposed on one side in the second direction of the first trunk descend toward one side in the first direction, longitudinal lengths of the plurality of first stationary electrode fingers disposed on the other side in the second direction of the first trunk ascend toward the one side in the first direction, the plurality of second stationary electrode fingers is disposed along the first direction, longitudinal lengths of the plurality of second stationary electrode fingers disposed on the one side in the second direction of the second trunk ascend toward one side in the first direction, and longitudinal lengths of the plurality of second stationary electrode fingers disposed on the other side in the second direction of the second trunk descend toward the one side in the first direction.

6. The physical quantity sensor according to claim 3, wherein the plurality of first movable electrode fingers is disposed along the first direction, longitudinal lengths of the plurality of first movable electrode fingers disposed on one side in the second direction of the first trunk descend toward one side in the first direction, longitudinal lengths of the plurality of first movable electrode fingers disposed on the other side in the second direction of the first trunk ascend toward the one side in the first direction, the plurality of second movable electrode fingers is disposed along the first direction, lengths along the second direction of the plurality of second movable electrode fingers disposed on the one side in the second direction of the second trunk ascend toward the one side in the first direction, and lengths along the second direction of the plurality of second movable electrode fingers disposed on the other side in the second direction of the second trunk descend toward the one side in the first direction.

7. The physical quantity sensor according to claim 1, wherein each of the plurality of first movable electrode fingers is located on one side in the first direction with respect to a paired one of the plurality of first stationary electrode fingers, and each of the plurality of second movable electrode fingers is located on the other side in the first direction with respect to a paired one of the plurality of second stationary electrode fingers.

8. The physical quantity sensor according to claim 1, further comprising:

a movable member support supporting the movable member, and attached to the base;

a first trunk support supporting the first trunk, and attached to the base; and a second trunk support supporting the second trunk, and attached to the base, wherein a bonding surface of the movable member support bonded to the base, a bonding surface of the first trunk support bonded to the base, and a bonding surface of the second trunk support bonded to the base are arranged side by side along the second direction.

9. The physical quantity sensor according to claim 8, wherein the movable member support is located between the first stationary electrode and the second stationary electrode in a plan view.

10. The physical quantity sensor according to claim 9, further comprising:

a first connector connecting the first trunk and the first trunk support to each other; and a second connector connecting the second trunk and the second trunk support to each other, wherein the first connector is located on an opposite side to the movable member support with respect to the first trunk support in a plan view, and the second connector is located on an opposite side to the movable member support with respect to the second trunk support in the plan view.

11. The physical quantity sensor according to claim 1, wherein the movable member includes a frame surrounding the stationary electrode in a plan view.

12. A physical quantity sensor device comprising:

the physical quantity sensor according to claim 1; and a circuit electrically connected to the physical quantity sensor.

13. A physical quantity sensor device comprising:

the physical quantity sensor according to claim 2; and a circuit electrically connected to the physical quantity sensor.

14. The physical quantity sensor device according to claim 12, further comprising:

a ceramic package housing the physical quantity sensor and the circuit.

15. The physical quantity sensor device according to claim 12, wherein the physical quantity sensor and the circuit are molded together.

16. An electronic apparatus comprising:

the physical quantity sensor according to claim 1; and a body housing the physical quantity sensor.

17. An electronic apparatus comprising:

the physical quantity sensor according to claim 2; and a body housing the physical quantity sensor.

18. A vehicle comprising:

the physical quantity sensor according to claim 1; and an attitude control device adapted to control an attitude of the vehicle based on a detection signal from the physical quantity sensor.

19. A vehicle comprising:

the physical quantity sensor according to claim 2; and an attitude control device adapted to control an attitude of the vehicle based on a detection signal from the physical quantity sensor.

* * * * *